(12) United States Patent
Hillman

(10) Patent No.: US 11,810,248 B2
(45) Date of Patent: *Nov. 7, 2023

(54) METHOD FOR PROCESSING IMAGE DATA TO PROVIDE FOR SOFT SHADOW EFFECTS USING SHADOW DEPTH INFORMATION

(71) Applicant: Unity Technologies SF, San Francisco, CA (US)

(72) Inventor: Peter M Hillman, Wellington (NZ)

(73) Assignee: Unity Technologies SF, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/583,192

(22) Filed: Jan. 24, 2022

(65) Prior Publication Data
US 2022/0292764 A1 Sep. 15, 2022

Related U.S. Application Data

(63) Continuation of application No. 17/198,975, filed on Mar. 11, 2021, now Pat. No. 11,232,628.

(60) Provisional application No. 63/111,801, filed on Nov. 10, 2020.

(51) Int. Cl.
*G06T 15/60* (2006.01)
*G06T 15/04* (2011.01)
*G06T 15/50* (2011.01)
*G06T 19/20* (2011.01)

(52) U.S. Cl.
CPC .............. *G06T 15/60* (2013.01); *G06T 15/04* (2013.01); *G06T 15/506* (2013.01); *G06T 19/20* (2013.01); *G06T 2210/61* (2013.01); *G06T 2215/12* (2013.01); *G06T 2219/2016* (2013.01)

(58) Field of Classification Search
CPC ....... G06T 15/60; G06T 15/04; G06T 15/506; G06T 19/20; G06T 2210/61; G06T 2215/12; G06T 2219/2016
See application file for complete search history.

(56) References Cited

U.S. PATENT DOCUMENTS

| | | | |
|---|---|---|---|
| 6,111,582 A | 8/2000 | Jenkins | |
| 6,556,200 B1 | 4/2003 | Pfister et al. | |
| 6,636,214 B1 | 10/2003 | Leather et al. | |
| 6,717,576 B1 * | 4/2004 | Duluk, Jr. | G06T 11/40 345/506 |
| 9,288,374 B1 * | 3/2016 | Cooper | H04N 5/23222 |
| 9,300,901 B2 * | 3/2016 | Grundhofer | H04N 9/3194 |
| 2016/0314619 A1 * | 10/2016 | Luo | G06T 7/344 |

OTHER PUBLICATIONS

Hanika, J., et al., "Camera Space Volumetric Shadows," in Proceedings of the Digital Production Symposium (DigiPro 12), (ACM, New York, NY), pp. 7-14. [https://doi.org/10.1145/2370919.2370921], 2012.

* cited by examiner

*Primary Examiner* — Charles Tseng
(74) *Attorney, Agent, or Firm* — Haynes and Boone, LLP

(57) ABSTRACT

An image dataset is processed with a shadow map generated from objects in a virtual scene that can cast shadows and the scene is rendered independent of the shadows. The shadow might be edited separately, and then applied to a post-render image of the scene to form a shadowed image. Light factor values for pixels of the shadow map might be stored as summed-area table values.

21 Claims, 22 Drawing Sheets

Pixel 502

Pixel 502 Data:

| |
|---|
| $d_4$ (Depth in Shadow Map) |
| ID 316 (Object ID) |
| dist 602 (Distance in Shadow Space to the Object) |
| α (transparency of object 316) |
| (other pixel data) |
| ... |

Pixel 504

Pixel 502 Data:

| |
|---|
| $d_1$ |
| ID 310 |
| dist 604 |
| $\alpha_2$ |
| (other pixel data) |
| ... |

METHOD FOR PROCESSING IMAGE DATA TO PROVIDE FOR SOFT SHADOW EFFECTS USING SHADOW DEPTH INFORMATION

CROSS-REFERENCES TO PRIORITY AND RELATED APPLICATIONS

This application is a continuation of U.S. application Ser. No. 17/198,975, filed Mar. 11, 2021, which claims the benefit of U.S. Provisional Patent Application No. 63/111,801, filed Nov. 10, 2020.

The entire disclosure(s) of application(s)/patent(s) recited above is(are) hereby incorporated by reference, as if set forth in full in this document, for all purposes.

FIELD

The present disclosure generally relates to methods and apparatus for generating images that include shadows and shadow effects in computer graphics and more particularly to processing shadows with depth information to be combined with other elements.

BACKGROUND

For computer-generated imagery or computer-enhanced imagery, whether individual images or video sequences of images sometimes referred to as frames, might be stored in computer memory such that computer systems, such as animation creation systems, renderers, projectors, etc. can access that imagery and operate on it or present it. In a basic representation, an image is stored in a form of a two-dimensional (2D) pixel array where each element or sample of the pixel array corresponds to a position on the image and has a pixel color value. The pixel color value might have a single component value or might have a plurality of component values. The image can be displayed by coloring pixels of a display according to the pixel color values that correspond to positions of the display. But one specific example is a stored representation of an image that is a rectangular image of R rows by C columns wherein the stored representation includes R×C pixel color values, each of which might comprise three or more component color values.

An image might be computer-generated from a scene description that describes virtual objects, lighting, effects, a camera position, a camera orientation, a camera viewing frame, etc. in a three-dimensional (3D) virtual space. An image generator, such as a renderer, might compute pixel color values based on which objects are intersected by rays from the camera position through pixel areas of the camera viewing frame. In an example, a scene description might specify the positions, shapes, texture, colors, etc. of various objects and a renderer could generate an image of what the scene would look like from a specified camera position through a specified camera viewing frame. Such a generated image might not show a far object if that far object is further from the camera position than a near object and both the far object and the near object are intersected by a viewing ray from the camera position through a pixel or pixels of the viewing frame. In some cases, such as where the near object is partially translucent or only covers a portion of a given pixel's area in the generated image, the resulting pixel color value for that given pixel might be a combination of color from the near object and color from the far object that can be partially seen at that given pixel. In a logical representation of an image, a pixel might have a nonzero area and a pixel cone or pyramid might be considered instead of a ray. In the general case, the camera position might be a point located in the 3D virtual scene space, a pixel is an area that is a portion of the camera viewing frame (which would represented as part of the resulting image representing a view from the camera position through the camera viewing frame), and a pixel color value represents color from objects that are within a volume swept out by rays that pass from the camera position through points within the pixel area. Thus, a pixel color value might be determined by sampling several rays through the pixel area, or determining what virtual objects are present, or partly present, within the swept-out volume.

The values of pixel color values might be determined by a rendering process, wherein the values are computed by inputting a scene description describing lights, objects, effects, etc., and their positions in a virtual space, such as a three-dimensional virtual space, and determining how light rays might propagate through the virtual space onto pixels of a view frame relative to a virtual camera position. Typically, when rendering a scene having opaque objects, light rays intersecting with such opaque objects are not propagated through the objects and as a result, a final rendering of the scene would include apparent shadows on objects that are shadowed from a light source by other objects.

When a scene is modified, such as by the removal of a first object that casts a shadow on a second object, the scene can be rerendered with the modified scene and the shadow will not be present. If the rendered image is directly modified by just removing the first object, the rendered image would have an apparent shadow that doesn't have any cause. In some cases, an image artist might choose to ignore that effect, or go through the computationally-intensive process of rerendering. In the case of high-resolution animation for feature films, for example, rendering can take days or longer.

A method and apparatus for processing an image or sequence of images to account for shadows is desirable.

SUMMARY

A computer-implemented method for processing image data that includes depth information and shadow effects might comprise, under the control of one or more computer systems configured with executable instructions, obtaining a scene description describing elements of a scene to be rendered into a computer-generated image, the elements comprising at least a point light source and a plurality of objects, wherein the point light source has a position in the scene and positions of obscuring objects of the plurality of objects in the scene are such that light from the point light source would be at least partially obscured by the obscuring objects, determining, from the scene description, a shadow map of the point light source, wherein the shadow map encodes for shadows cast by the obscuring objects, determining area light parameters for an area light, wherein the area light is represented by a geometry of a nonzero light area positioned in the scene, determining, for a given point on a shadowed object, a deep shadow data element, wherein the deep shadow data element represents intersecting objects that intersect a shadow ray from the point light source to the given point and penumbra objects that do not intersect the shadow ray but intersect a ray from an area light point of the nonzero light area to the given point, and determining, for the given point, a shadow value, wherein the shadow value has a value between a minimum shadow value and a maximum shadow value, the shadow value based on at least intersecting objects and cross distances of penumbra objects represented in the deep shadow data element and a position along the shadow ray of intersecting objects and/or penumbra objects.

The deep shadow data element might encode for the area light parameters whereby the deep shadow data element includes references to objects that are within a light volume defined by the area light parameters and the given point on the shadowed object. The deep shadow data element might include an acceleration structure. The acceleration structure might comprise a summed area table.

The shadow value contribution of a given object might be either an intersecting object or a penumbra object is based, at least in part, on a ratio of a first distance between the point light source and the given point and a second distance between the given object and the given point.

The shadow map might comprise a plurality of depth samples per pixel.

The method might further comprise computing deep pixel maps for a plurality of pixels, editing the scene by modifying samples in the deep pixel maps based on objects in the scene being modified, modifying the shadow map to account for the objects in the scene being modified to form a modified shadow map, and recompositing the computer-generated image with the modified shadow map.

The method might further comprise modifying the scene to reflect movement of the point light source relative to the plurality of objects in the scene, the movement being according to a movement vector, and modifying the shadow map by moving it according to the movement vector.

A computer system might comprise one or more processors and a storage medium storing instructions, which when executed by the at least one processor, cause the system to implement the methods described herein. A non-transitory computer-readable storage medium storing instructions, which when executed by at least one processor of a computer system, might cause the computer system to carry out the methods described herein. A computer-readable medium carrying instructions, which when executed by at least one processor of a computer system, might cause the computer system to carry out the methods described herein. A carrier medium might carry image data that results from independent shadow processing according to the methods described herein.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the surface computation method, as defined in the claims, is provided in the following written description of various embodiments of the disclosure and illustrated in the accompanying drawings.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

An image management system, as might be part of an animation creation system, might generate the pixel array with more information per pixel than just an ultimate pixel color value that might be displayed for a given pixel. A "deep image" might refer to a stored representation of an image that includes pixel color values for different depths of a pixel. With such a deep image representation, instead of just a pixel color value for a pixel area of the camera viewing frame, the deep image representation might include a plurality of pixel color values, with different ones of the plurality representing pixel color values at different depths. In one interpretation, a stored pixel color value, P, for a depth, D, for a pixel at image location (X, Y) might represent a pixel color that would be seen at pixel location (X, Y) in the image but for objects that are intersected by a ray from the camera position through pixel location (X, Y) when those objects are at a depth of less than D. With a stored representation of pixel color values at multiple depths, it might then be a simple matter to appear to "remove" objects from an image.

In an example, consider a scene description where a ray from the camera position through a pixel, P1, or the area thereof, passes through a first opaque object, O1, at a depth D1 and passes through a second opaque object, O2, at a depth D2, where D1<D2. A simple image would show a pixel of object O1 at pixel P1. A deep image might store color values for both objects and their corresponding depths. From such a deep image, an animator or other image processor or user could specify that objects at depths of D3 or less where D1<D3 should be removed. An image generation system has enough information to "remove" object O1, which can appear to be done in the image by using the stored pixel color value for (P1, D2) instead of the stored pixel color value for (P1, D1). As a result, a deep image can be useful when working with images generated from 3D scene descriptions or other 3D representations where changes are desired after the image is generated.

While removing and adding objects might correctly illustrate those objects in an image, where the objects cast shadows, the editing of a scene can be more complicated.

Figure 1:
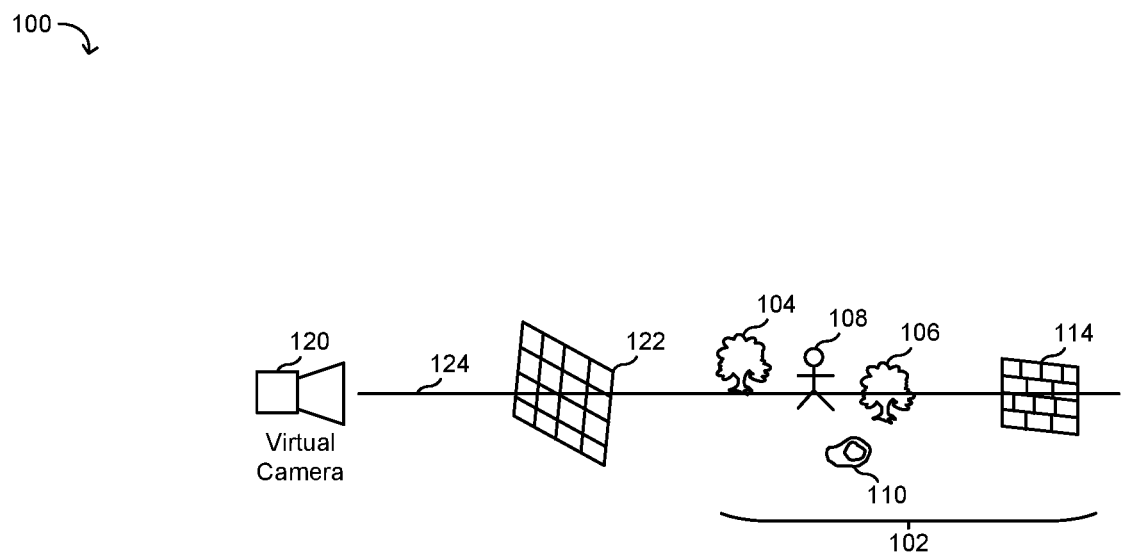
FIG. 1 illustrates a process used to compute deep image data as might represent a virtual scene, in an embodiment.

FIG. 1 illustrates a process used to compute deep image data as might represent a virtual scene, in an embodiment. A deep image might be represented by data corresponding to pixels in image space. The deep image might be generated from virtual objects described in a scene space and then by rendering, or otherwise, is represented in an image dataset that might specify, for example, for each pixel in a pixel array, a pixel image value array. Each entry in the pixel image value array might comprise a pixel sample representing a pixel color value, an optional alpha value, a depth value or a depth range, and an object identifier identifying which object contributes that color/alpha at the specified depth. The pixel image value array might be associated with a particular pixel by an explicit reference to an associated pixel position or the particular pixel might be determinable by a position of the pixel image value array within the image dataset.

In a specific example, a scene description might describe tree objects in a forest of trees. An image dataset might be provided to an animator that is a deep image of that scene, rendered into a deep image. The animator might specify which trees are to be removed from the scene as a running character is added into the scene. With each object's contribution to a pixel color value provided by the deep image dataset, removing some trees can be done by searching the image dataset for pixel image value array samples, over all the pixel image value arrays, that have object identifiers equal to the object identifiers of the trees to be removed. Samples can be added of the character to the pixel image value arrays of pixels intersected by the character at the depth of the character in the scene. As each pixel image value array might be an arbitrarily long list of data, compression can be useful to make handling of large image datasets easier. For example, within in an image there might be thousands of array samples for a given pixel (or there could be as low as zero samples for some pixels).

As illustrated in FIG. 1, capturing 100 of data related to a virtual scene can involve virtual objects 102 placed in a scene space, such as a tree 104, a tree 106, a person 108, a rock 110, and a brick wall 114. To generate an image of the virtual scene, an image-generating computer would compute which virtual objects 102 are visible from a camera 120 at a camera position through pixels of a view frame 122 by computing which objects intersect a ray 124 running between the camera position and a z-depth point toward the back of the image through a given pixel. For a deep image, rather than just storing a single color value (or color vector in a color space), the deep image might include pixel colors for objects at different depths along ray 124. In this example, where brick wall 114 covers the entire pixel, any objects that are further from the camera than brick wall 114 can be ignored. Alternatively, they might be included in the depth image to provide for the case where brick wall 114 might be moved in editing. In some embodiments, more than one ray is used per pixel and a combination method is used to derive the data for the deep image. In some embodiments, a deep pixel data structure represents accumulating color effects from a camera position to a z-depth point on a ray from the camera position (which can be cut off once the ray intersects a totally opaque object that encompasses all of the pixel), while in other embodiments, a deep pixel data structure represents accumulating color effects from the z-depth point to the camera position.

Figure 2:
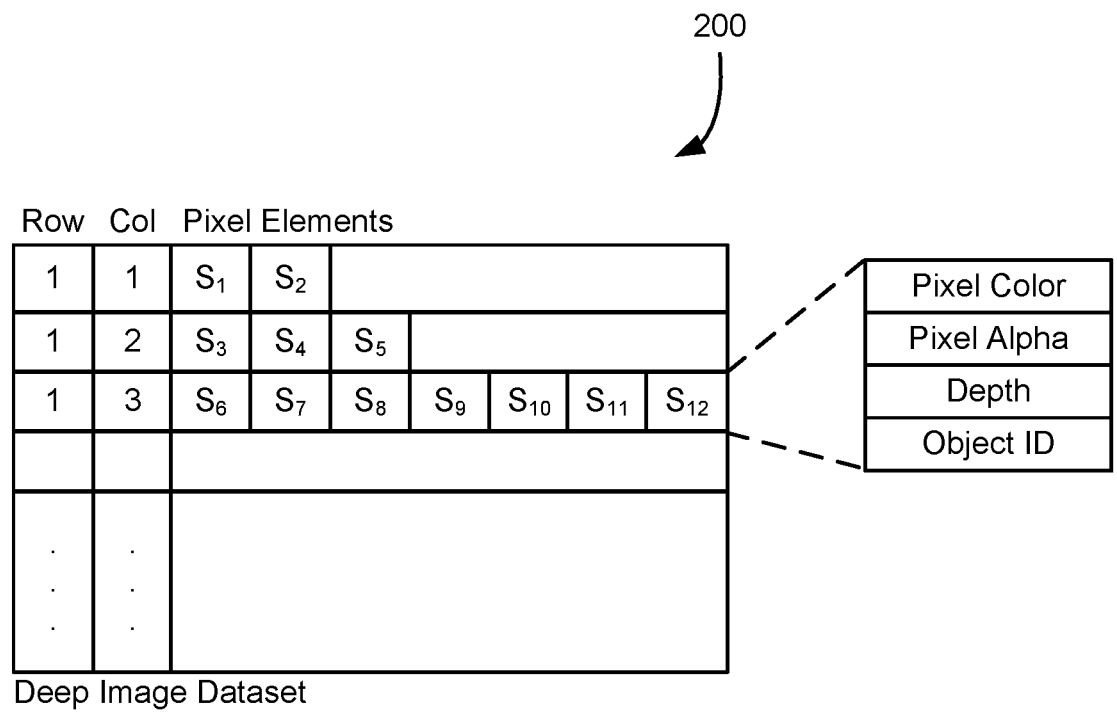
FIG. 2 illustrates a data structure that might be used to store a deep image dataset representing a deep image of a virtual scene, in an embodiment.

FIG. 2 illustrates a data structure that might be used to store a deep image dataset 200 representing a deep image of a virtual scene, in an embodiment. Deep image dataset 200 might include one row per pixel of a deep image, possibly omitting unused pixels. As illustrated, each pixel might be represented by one or more pixel samples, indicated as S1, S2, . . . in FIG. 2. In that example, the pixel at location (1, 1) in the image has an array comprising two pixel samples, the pixel at location (1, 2) in the image has an array comprising three pixel samples, and the pixel at location (1, 3) in the image has an array comprising seven pixel samples. Each pixel sample might contain data indicating a pixel color (which could be a single value, three values, or some other representation of a pixel color value), a pixel alpha (which might range from 0.0 to 1.0 to indicate a degree of transparency), a depth representing a distance from a camera position to an object that is contributing color to that pixel, and an object identifier identifying that object. While the contributions of objects in these examples are pixel colors, it may be that other attributes of objects are used instead of, or in addition to, color. The length of a pixel image value array might be one or more image value array samples, each having an image value, a depth value, and an association with an associated pixel position. The pixel position might be explicit, as illustrated in the data structure of FIG. 2, or might be implied by the data structure used to store the pixel image value arrays. As the number of samples in a pixel image value array might be large for a deep image of a large number of objects and/or complex objects, the deep image dataset might be large and required a large amount of memory to store, bandwidth to transfer, and computational resources to process.

Figure 3:
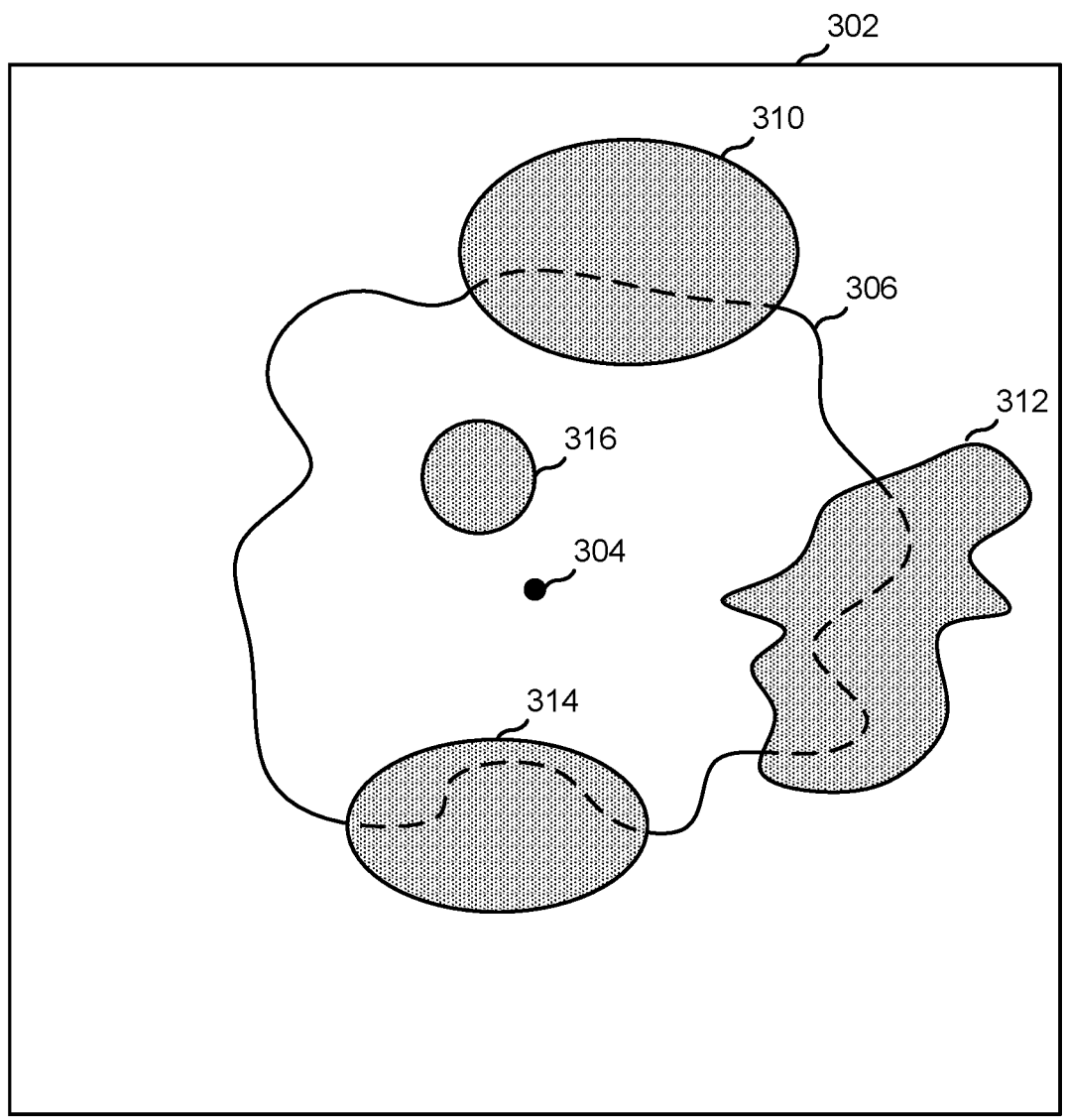
FIG. 3 is a diagram representing a view of a virtual scene from a perspective of a point light source, according to various embodiments.

FIG. 3 is a diagram representing a view 302 of a virtual scene from a perspective of a point light source 304. The virtual scene is shown comprising obscuring objects 310, 312, 314, and 316 and an object 306. The obscuring objects are positioned in the virtual scene such that they could block light rays from point light source 304 from reaching object 306 in places. The virtual scene might include objects that ultimately might be rendered from the perspective of an image camera positioned elsewhere in the virtual scene, but can also include objects or effects that do not render. For example, it might be desirous to have a shadow casted into a scene not from any object, but to allow for later insertion of elements that might be expected to cast a shadow. In some cases, the obscuring objects are partially transparent. In some embodiments, arbitrary light absorbing features might be implemented to have effects similar to shading in shadow.

In a hard shadow rendering of the virtual scene, rays from point light source 304 to object 306 that touch edges of obscuring objects could define bounds of shadows cast onto object 306. However, in many instances, soft shadows are desirable and other than point light sources might be implemented. To that end, effects of nearby objects, and not just touching objects, can be taken into account. For example, obscuring object 316 might cast a penumbral shadow along a ray that passes by obscuring object 316 but that does not actually touch.

Figure 4:
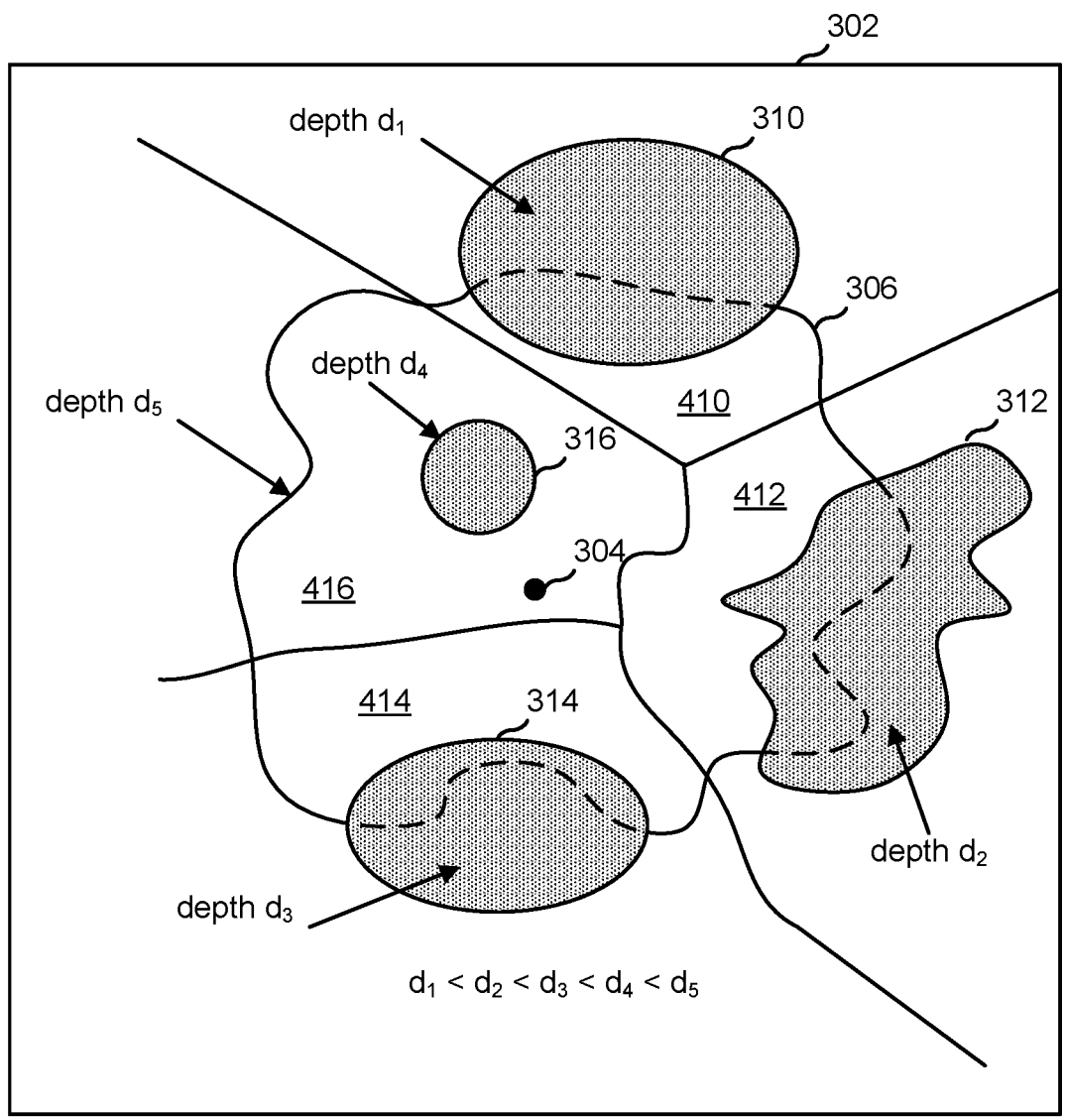
FIG. 4 illustrates a partitioning of a shadow map into regions deemed closest, in shadow map space, which can be a pixel array from a perspective of a point light source, according to various embodiments.

FIG. 4 illustrates a partitioning of a shadow map into regions deemed closest, in shadow map space, which can be a pixel array from a perspective of point light source 304. As shown there, rays from point light source 304 (which is to be understood as being above the page relative to other objects depicted), could be grouped into various regions, such as region 410 deemed to be all the rays that pass closer to obscuring object 310 than any other object. Note that it need not be the case that the region boundaries exactly conform to a closeness criterion, but often that is a simple criterion to compute and use. Likewise, region 412 might be deemed to be all the rays that pass closer to obscuring object 312 than any other object, region 414 might be deemed to be all the rays that pass closer to obscuring object 314 than any other object, and region 416 might be deemed to be all the rays that pass closer to obscuring object 316 than any other object.

In the example of FIG. 4, the obscuring objects and object 306 have depths that correspond to distances from point light source 304 to that object. In a data structure representing depths for objects, the data structure might store various depths, perhaps to reflect a nonzero thickness of objects. In processing object data, a processor can take into account the depths, such as when determining as between two objects, which one (or both) cast shadows on the other.

Figure 5:
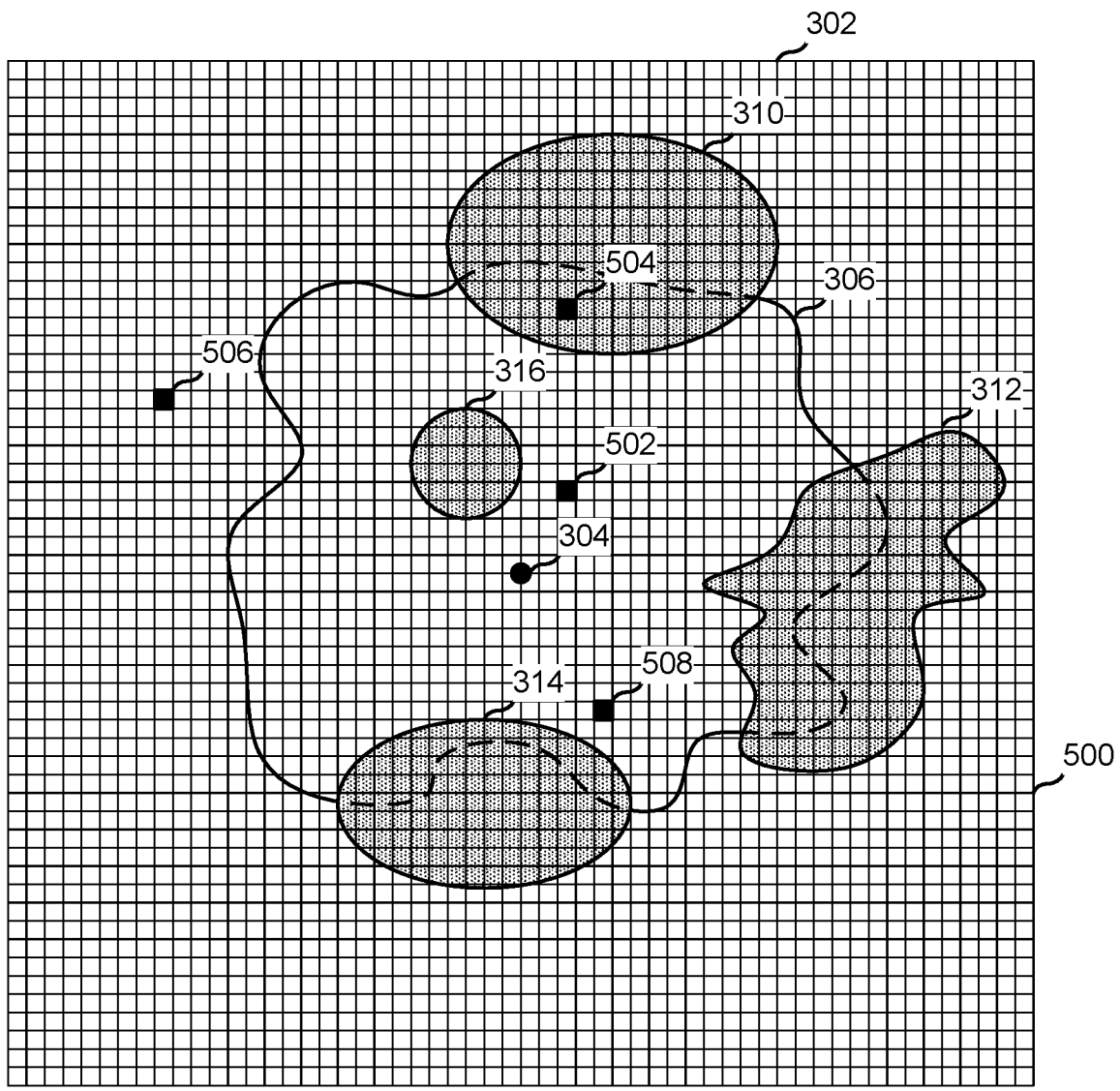
FIG. 5 illustrates a pixel overlay that overlays the view of the virtual scene, according to various embodiments.

FIG. 5 illustrates a pixel overlay 500 that overlays view 302. Also shown there are pixels 502, 504, 506, and 508 of a shadow map. In a data structure corresponding to what is shown in FIG. 5, the data structure might be represented as a two-dimensional array of pixel values, wherein one pixel value corresponds to one of the grid squares illustrated in FIG. 5 and wherein the pixel value might be a vector or compound value having a plurality of component values. Those component values might include a deep pixel representation of shadow values along a ray from point light source 304 through a respective grid square. For example, the pixel value for pixel 502 might be a deep pixel representing, for various depths along a corresponding ray, how much that pixel is in shadow at various depths.

In some variations, a shadow value is a specific form of a light factor along the ray and shadows are but one of various reasons for there to be a light reduction by the light factor at points along the ray. For example, some virtual scenes might include elements that absorb passing light in ways other than simply obscuring light passage.

Figure 6:
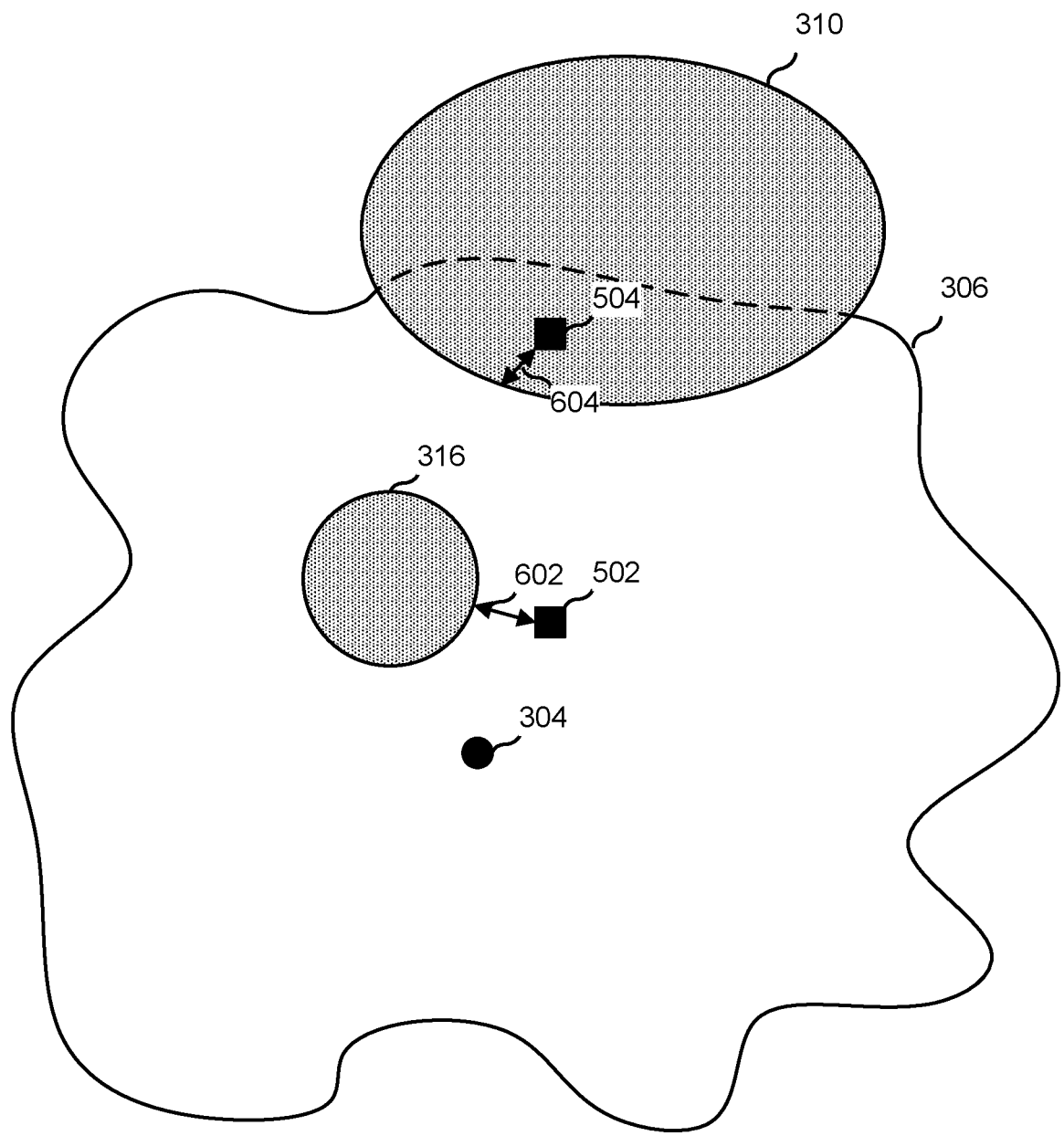
FIG. 6 shows pixels of a shadow map and cross distances in shadow map space, according to various embodiments.
Figure 8:
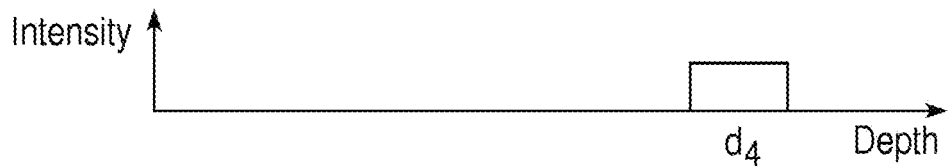
FIG. 8 partially illustrates examples of data structures that might support deep pixels of a shadow map, according to various embodiments.
Figure 8:
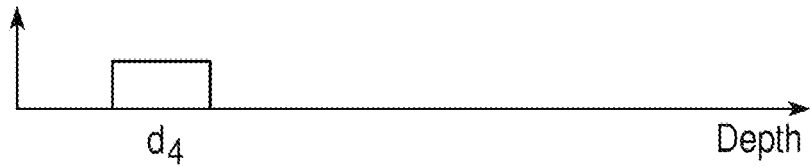

FIG. 6 shows pixels of a shadow map and cross distances in shadow map space (e.g., the pixel array generated from a perspective of a light source) from obscuring objects. In this example, pixel 502 is closest to an edge of obscuring object 316 and so it would have an associated cross distance 602 from that object, while pixel 504 is closest to an edge of obscuring object 310 (and intersects obscuring object 310) and so it would have an associated cross distance 604. Examples of such data structures are illustrated in FIG. 8. In some representations, cross distance 604 would be stored as a negative number while cross distance 602 would be stored as a positive number.

Figure 7:
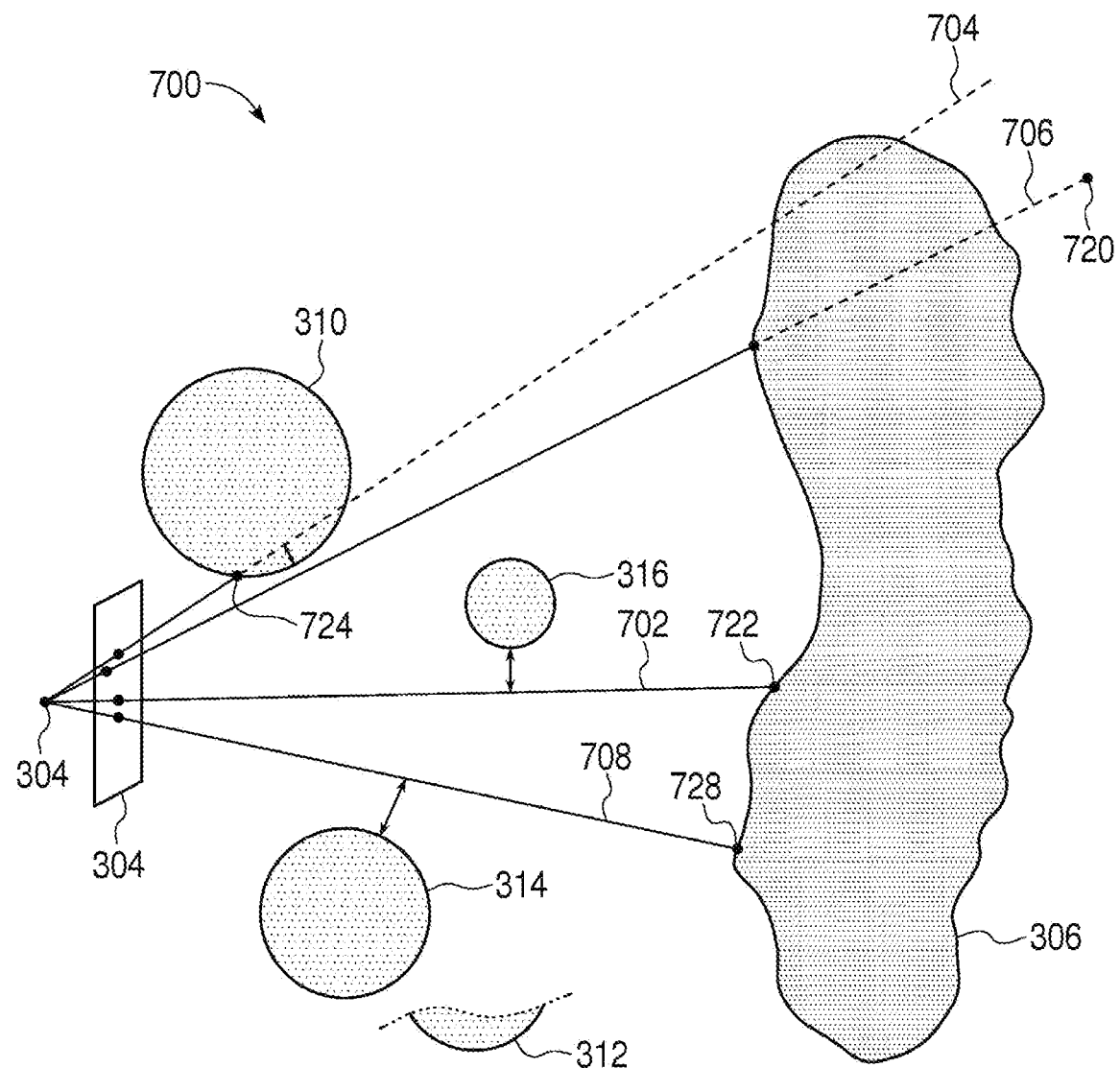
FIG. 7 is a view from an image camera perspective of the virtual scene depicted in earlier figures, according to various embodiments.

FIG. 7 is a view 700 from an image camera perspective of the virtual scene depicted in earlier figures. As illustrated there, rays 702, 704, 706, and 708 correspond to pixels 502, 504, 506, and 508 respectively, of a shadow map corresponding to view 302. Note that ray 702 ends at point 722, assuming that object 306 is entirely opaque, and passes close to obscuring object 316. Thus, in cases such as deriving soft shadows, the data structure of a shadow map that encodes for pixel 502/ray 702 includes a representation of a cross distance between ray 702 and an edge of obscuring object 316. Ray 704 ends at point 724 on obscuring object 310, again assuming opaqueness, but might include additional data about ray 704 beyond point 724 that can be used in cases where area lights or some effect is used that would allow for light to propagate behind obscuring object 310. As illustrated, ray 706 misses object 306 and ends at a point 720, which might be a virtual scene background. Lastly, ray 708 ends at point 728 and the nearest obscuring object encountered is obscuring object 314. In FIG. 7, obscuring object 312 is partially omitted for clarity.

FIG. 8 partially illustrates examples of data structures that might support the above-mentioned data. In this example, a deep pixel data structure might include data for pixel 502 that also corresponds to ray 702 shown in FIG. 7, wherein as a function of depth, there is one sample at depth $d_4$, the depth of obscuring object 316, which is the obscuring object closest to ray 702 (see FIGS. 5 and 7). The deep pixel data structure might include data for a shadow map depth of the closest obscuring object, an object identifier of the closest obscuring object, a cross distance in shadow map space from the pixel to an edge of the closest obscuring object, a transparency of the closest obscuring object, and possibly other pixel-related data.

In the example of pixel 504, the pixel data would indicate depth $d_1$, the depth of obscuring object 310, an object identifier of obscuring object 310, a cross distance in shadow map space from the pixel to an edge of obscuring object 310, a transparency of obscuring object 310, and possibly other pixel-related data.

Figure 9:
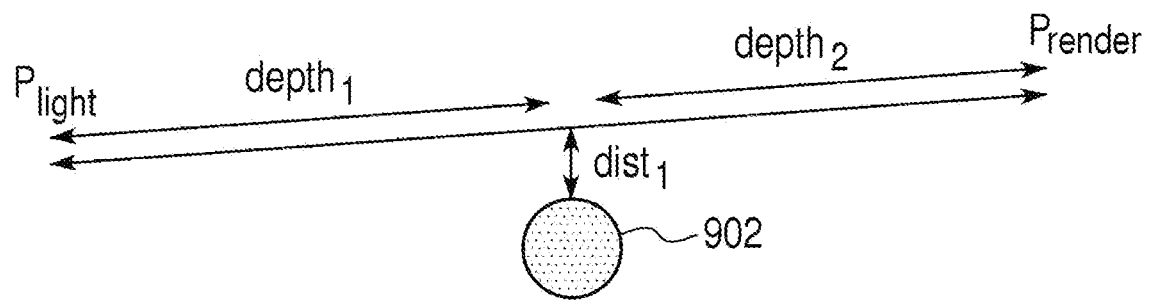
FIG. 9 illustrates an example of some pixel-related data that might be stored in deep pixels of the shadow map, according to various embodiments.

FIG. 9 illustrates an example of some pixel-related data that might be stored in deep pixels of the shadow map. In addition to storing a cross distance to an edge of an obscuring object 902, $dist_1$, the deep pixel can also include data representing a distance, depths, from a point light source, $P_{light}$, to a closest point to obscuring object 902, and a distance from that closest point to a point being rendered, $P_{render}$. These values can be used to quickly compute a light factor that corresponds to how much light from point $P_{light}$ might be reduced (or otherwise altered) at point $P_{render}$ due to the presence of obscuring object 902. For example, where an area light is used instead of a point light source, those distances (depth distances and cross distances) can be used to calculate a soft shadow percentage at the render point. Examples and details are shown in other figures. See, for example, FIG. 17.

Figure 10:
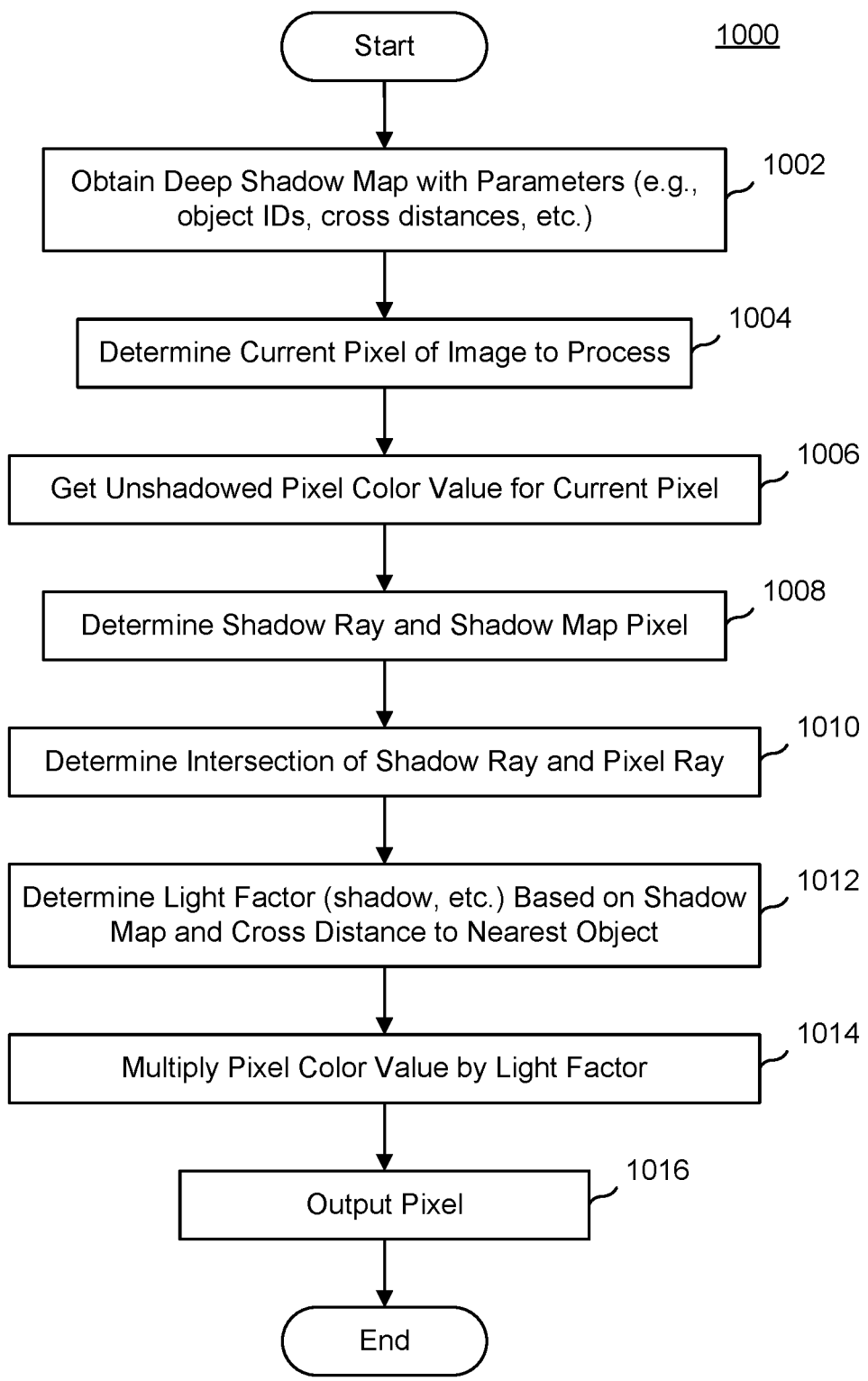
FIG. 10 is a flowchart of a process for computing a light factor and applying it to a pixel, according to various embodiments.

FIG. 10 is a flowchart of a process for applying a light factor to a pixel. This process might be used over multiple pixels. Notably, all of the light factor computations could be done before the pixel colors of the to-be-rendered objects are known, or at least be done independently of those pixel colors. In a specific case, a light factor at a pixel of an image to be rendered is a shadowing factor, which can be represented as a value between 0.0 and 1.0 inclusive corresponding to how much of a shadow is being cast onto an object that is an image ray for that pixel of that image. That pixel might itself be a deep pixel, accounting for shadows cast at differing depths, such as being illustrated in FIG. 12. Since the shadow map can be computed without knowledge of what objects are to be rendered, the rendering can occur and the shadows later added in compositing.

In the process shown in FIG. 10, as might be performed by a processor, first a deep shadow map is obtained (in step 1002) wherein the deep shadow map has parameters that support the soft shadow/area lights features mentioned herein. In this example, those parameters for each pixel in the shadow map might include object identifiers (of a closest obscuring object) and cross distances (a distance in shadow map image space from the pixel to an edge of the obscuring object), and perhaps other data fields as mentioned herein, such as in reference to FIG. 8. Next, in step 1004, the processor determines a current pixel of an image to process. The process might be repeated for multiple pixels.

In step 1006, the processor obtains an unshadowed pixel color value for the current pixel. This might be available from a rendered image that is rendered without shadowing. In step 1008, the processor determines which shadow ray and shadow map pixel applies, and in step 1010, the processor determines an intersection of the shadow ray with a pixel ray, representing where on a rendered object in the image view a ray from the light source falls. In step 1012, the processor computes a light factor (shadow, etc.) based on the shadow map and the cross distance to the obscuring object. In step 1014, the processor multiplies the pixel color value by the light factor and, in step 1016, outputs the resulting pixel.

Figure 11:
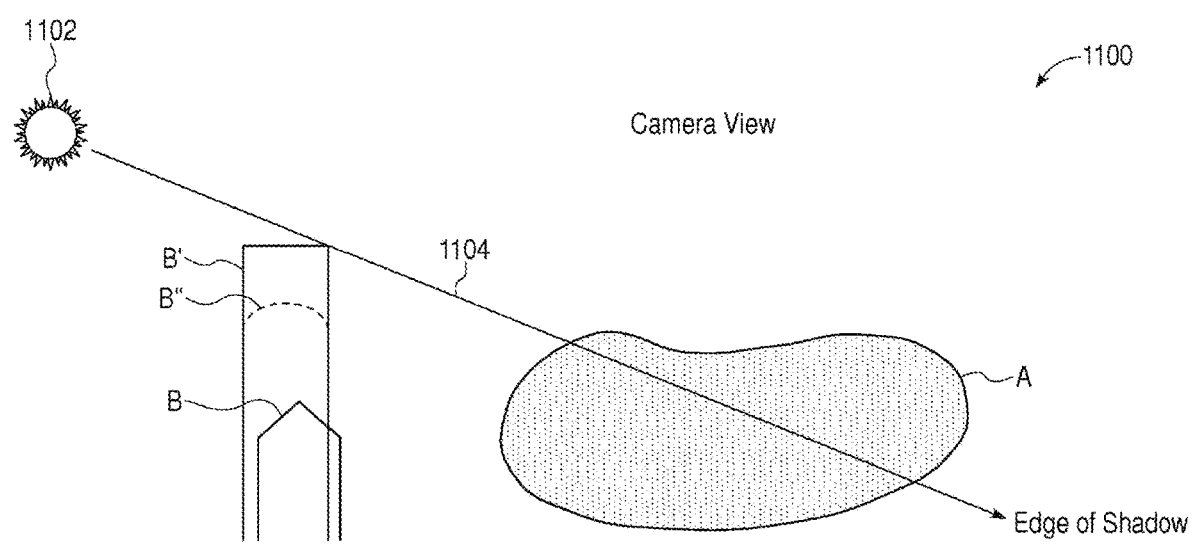
FIG. 11 illustrates a view of a scene, from a camera view position, as might be generated as a virtual scene having various objects therein, according to various embodiments.

FIG. 11 illustrates a view of a scene 1100, from a camera view position, as might be generated as a virtual scene having various objects therein. In this simplified example, the scene comprises objects A, B, B', and B" as viewed from a camera view point. A light source 1102 can illuminate object A and objects B, B', and B" might be positioned in the virtual scene such that they would cast shadows of light source 1102 onto object A. A ray 1104 indicates an edge of a shadow cast from object B', the tallest of the objects casting shadows. In a simpler rendering process, rendering could bake in the effects of the shadows onto the colors of pixels comprising object A, but then it might be difficult to adjust the image to remove some objects and their shadows.

Figure 12:
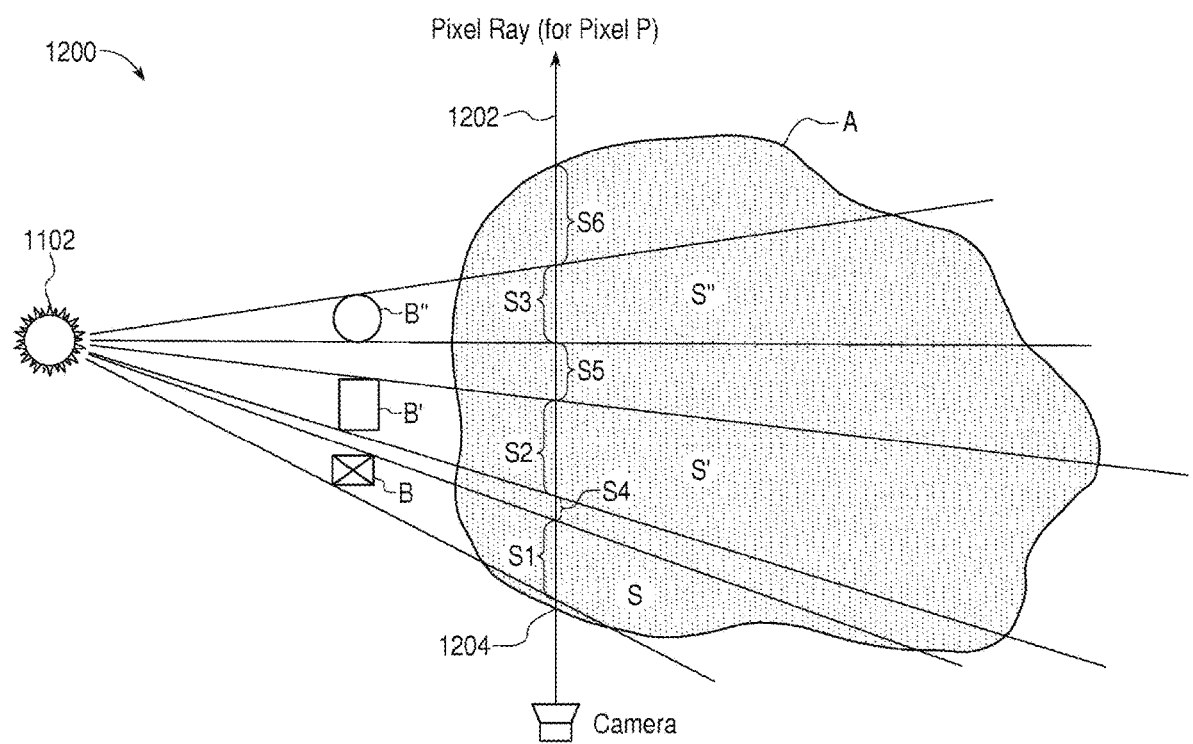
FIG. 12 illustrates a top view of the scene of FIG. 11.

FIG. 12 illustrates a top view 1200 of the scene of FIG. 11. This top view 1200 would be from above the scene. Each object B, B', B" casts a shadow S, S', S", respectively, onto object A, now viewed from above. A pixel ray 1202 is a ray along which objects and shadows might contribute to a pixel color value for a pixel P. It should be understood that processes herein for determining a pixel color value for a pixel can be repeated for multiple pixels to form an image. Where object A is entirely a completely solid object, the pixel color value for pixel P would be determined by the color emitted by object A (by its own illumination or by reflection) at a point 1204 on a surface of object A. If that were the case, none of the shadows S, S', S" would need to be taken into account, as shadow S does not extend to point 1204. However, it is often desired to render shadows on more complex objects, such as where object A has some transparency. In such a case, the illumination of volume points of object A along pixel ray 1202 might comprise effects of each of the shadows. In one approach, the contributions along pixel ray 1202 are accounted for including the shadows. In another approach, illumination along pixel ray 1202 is rendered without taking into account at least some shadows or no shadowing at all is used in rendering. In FIG. 12, the samples S1, S2, and S3 would be rendered without shadows, reflecting the full intensity of incident light from light source 1102 in samples S1, S2, and S3, which could be stored as deep pixel samples for pixel P. The pixel color value might also take into account samples S4, S5, and S6, which would be the same whether or not shadows are rendered, as they are not obscured from the light.

Figure 13:
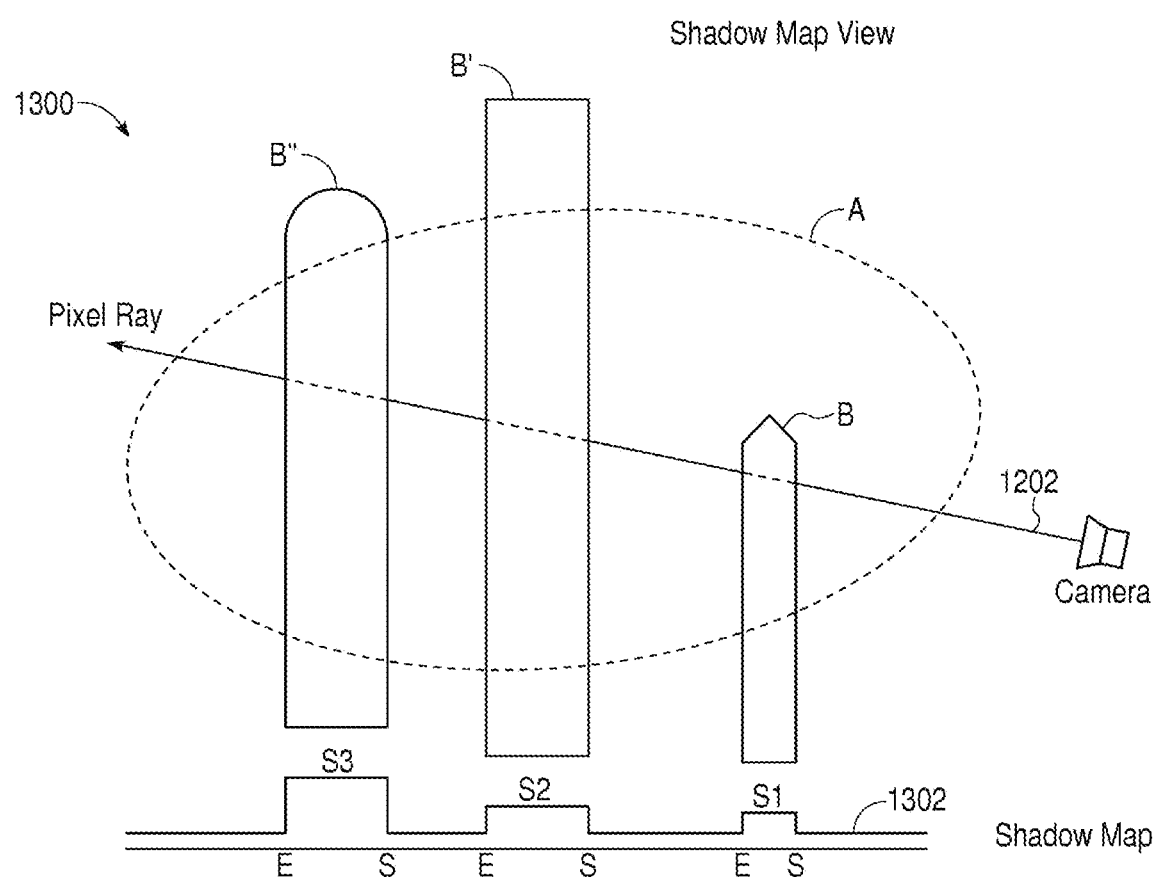
FIG. 13 illustrates a view of the scene of FIGS. 11-12 from a light source view.

FIG. 13 illustrates a view 1300 of the scene of FIGS. 11-12 from a light source view. As illustrated the objects B, B', B" obscure object A from the light (coming from above the page), at least along pixel ray 1202. A shadowing render could be generated having deep pixels to form a shadow map, of which deep pixel shadow map 1302 is one example. A plurality of deep shadow pixels might be stored as a deep image dataset as illustrated in FIG. 2, but need only store a shadow value for each sample. Where a scene uses multiple light sources, multiple such deep shadow map datasets might be generated and stored. In one embodiment, a sample is stored comprising a depth, S, at which a shadow sample starts and a depth, E, at which the shadow sample ends, as in FIG. 13. In some instances, the amount of shadow might vary, as in the case where object B" provides more shadowing and thus S3 has a higher value for intensity. Note that the shadow map can be generated independently of rendering a scene, if desired.

Figure 14:
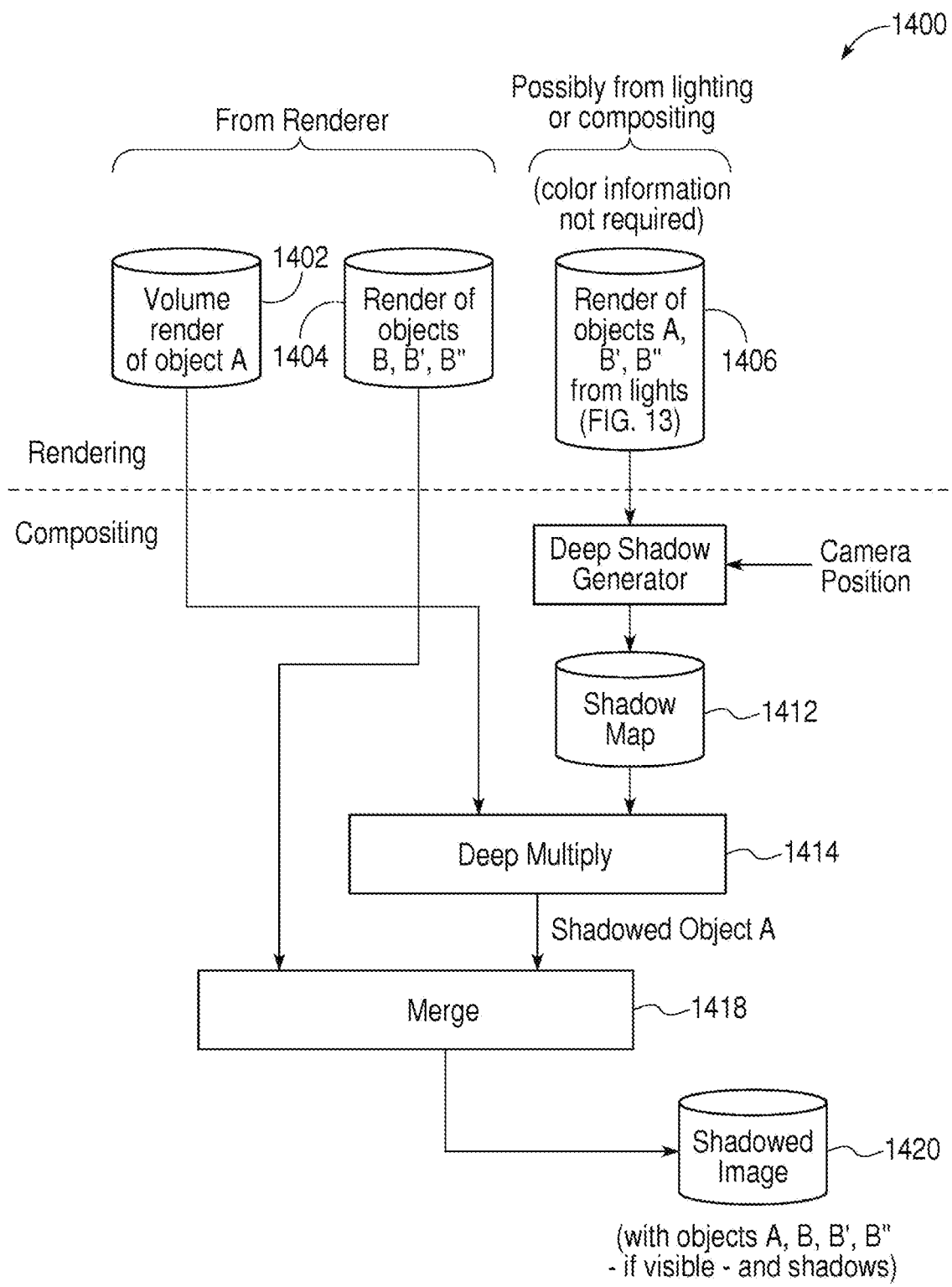
FIG. 14 is a block diagram of an image processing system for processing objects of the scene of FIGS. 11-13, according to various embodiments.

FIG. 14 is a block diagram of an image processing system 1400 for processing objects of the scene of FIGS. 11-13. Data structures shown in FIG. 14 might be generated by a renderer or some other computer graphics process. For example, a volume render object A shown in FIGS. 11-13 might be generated by a renderer and stored as a deep pixel image dataset 1402. A render of objects B, B', B" might be also performed by a renderer and stored as a deep pixel image dataset 1404. An image dataset 1406 might be generated by a lighting system or a compositing system to represent positions of objects relative to a light source, as illustrated in FIG. 13. In this example, the rendering for deep pixel image dataset 1402 might be done without considering shadows.

A deep shadow generator 1410 receives an input of a camera position. From that, and image dataset 1406, the deep shadow generator 1410 generates a shadow map 1412. The shadow map 1412 might be stored as deep pixels with each deep pixel having one or more samples, as illustrated by deep pixel shadow map 1302 shown in FIG. 13. Since color need not be present for the shadow map, it might be stored just as shadow values per pixel sample.

A deep multiply unit 1414 can then combine deep pixel image dataset 1402 and shadow map 1412 to form an image dataset for an image with object A shadowed appropriately.

This can then be merged by a merge unit 1418 with deep pixel image dataset 1404 (at least as to the shadow-casting objects that appear in the image), to output a shadowed image dataset 1420.

The shadow map 1412 might be processed to soften shadows, eliminate some shadows, or other adjustments, before being supplied to deep multiply unit 1414.

Figure 15:
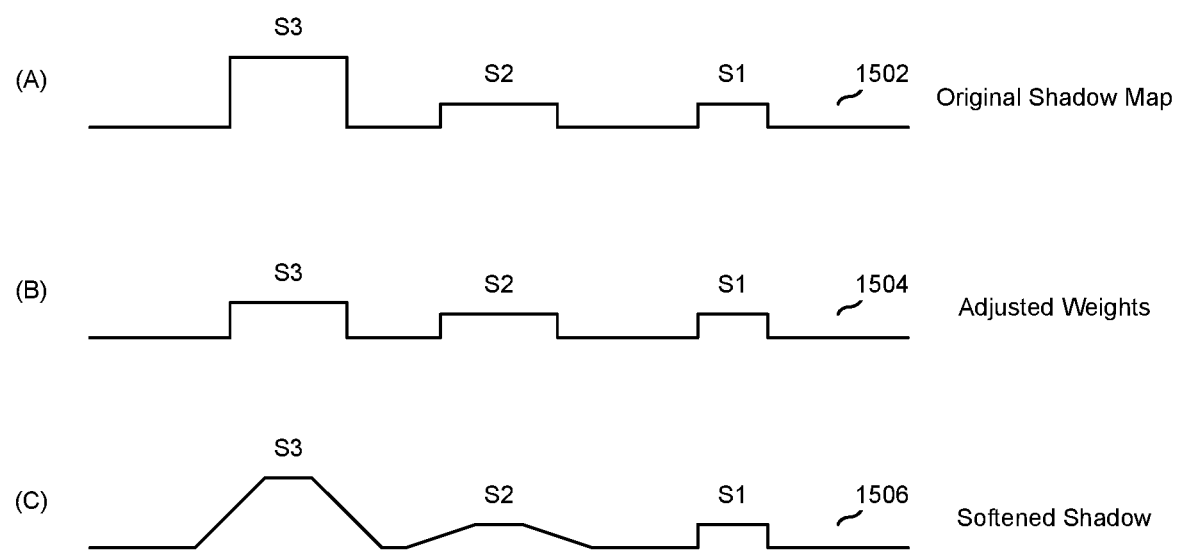
FIG. 15 illustrates shadow adjusting as might be done in a deep shadow generator, according to various embodiments.

FIG. 15 illustrates shadow adjusting as might be done in a deep shadow generator. Deep pixel A 1502 illustrates a basic shadow map as might be generated as described above. Where artist inputs or procedural code indicates, some of the shadows might be made less intense, as in the example of sample S3 in deep pixel B 1504. To create an effect similar to that of an area light, despite the fact that the image dataset 1406 assumes sharp edges to samples given that the light source is a point source, the shadow map can be adjusted to soften the shadows. In the example shown in FIG. 15, deep pixel C 1506 reflects softening of the shadows. Since the deep shadow generator 1410 has data corresponding to position of the objects casting shadows and the depth from the light to the shadow-casting object and the pixel ray, it can spread a shadow sample correspondingly. For example, if the object casting the shadow of S1 were much closer to the pixel ray (and the object(s) being rendered for that pixel ray), the spreading would be lower.

Figure 16:
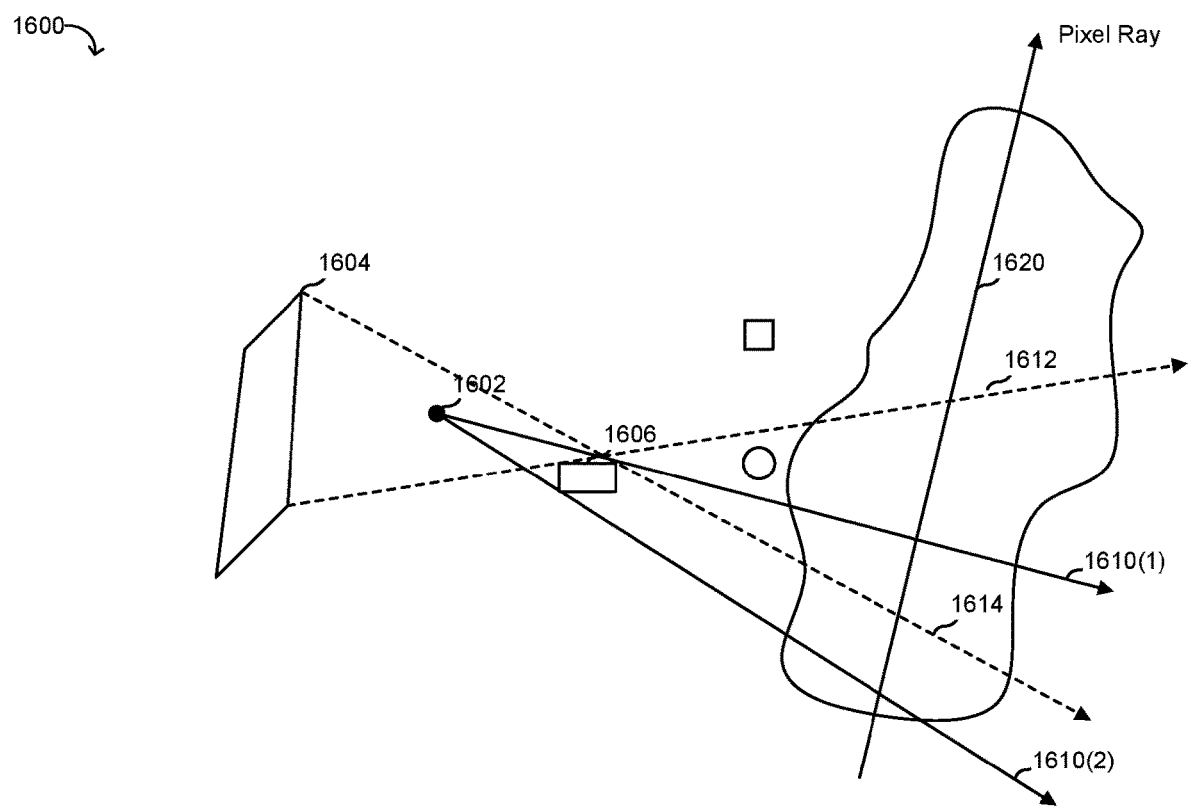
FIG. 16 illustrates a scene wherein a pixel ray can be adjusted by a shadow map generator to create an effect of an area light, according to various embodiments.

FIG. 16 illustrates a scene 1600 wherein a pixel ray can be adjusted by a shadow map generator to create an effect of an area light. In that example, a point light source 1602 is used for rendering and the like, with shadows omitted. A shadow deep image dataset might be generated as for image dataset 1406. An area light 1604 could be rendered as a large number of point lights, but that can be computationally expensive. Point light source 1602 would have a shadow of object 1606 cast as indicated by lines 1610(1) and 1610(2), while a top of area light 1604 would have a penumbra spread between the lines 1612 and 1614. The shadow map generator could instead adjust the shadow map by softening the deep shadow pixel for pixel ray 1620 and the shadow map would be reflecting the use of an area light. The amount of adjusting could be easily computed by the shadow map generator from the geometry of the computed area light, the position of the computed area light relative to the pixel ray, and the position of the shadow-casting object relative to the pixel ray and the computed area light.

In some instances, objects that are not within a line from the point source to the pixel ray are taken into account, if they would partially obscure light from an area light.

Figure 17:
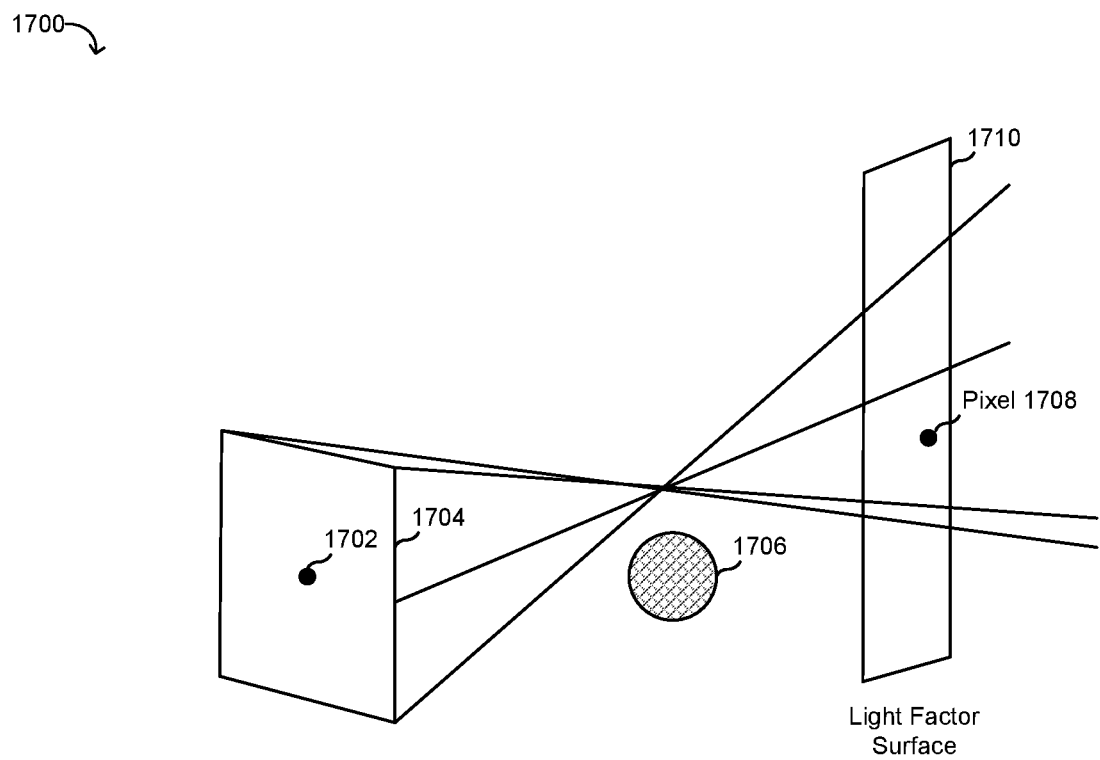
FIG. 17 how a shadow map might be used to quickly compute a light factor at a point where light is from an area light and the shadow map data is stored as a summed-area table, according to various embodiments.

FIG. 17 how a shadow map might be used to quickly compute a light factor at a point where light is from an area light and the shadow map data is stored as a summed-area table. FIG. 17 also illustrates an example of computing shadow maps taking into account nearby objects that might cast penumbral shadows.

As shown there, a shadow map might have been computed relative to point light source 1702 and it might be desired to determine light factors at various points given that the light source is an area light 1704. Area light 1704 could be implemented as a large array of point light sources, but that is computationally expensive. The light factors in a shadow map can be computed taking into account shadows cast by obscuring object 1706 onto pixels, such as pixel 1708, of a light factor surface 1710, which might be a rendered object surface, but need not be. To determine a light factor value at pixel 1708 for an area light using a shadow map that was generated using point light source 1702, a processor could average light factors over light factor surface 1710 over an area that corresponds to the area of area light 1704. As averaging over a large number of pixels of light factor surface 1710 can be computationally expensive, instead of storing light factor values pixel by pixel, the shadow map can store summed-area values at each pixel. In that manner, the computation of a sum of contributions of all of the pixels in a corresponding area of light factor surface 1710 can be quickly performed using around four additions/subtractions rather than having to sum over all pixels.

Figure 18:
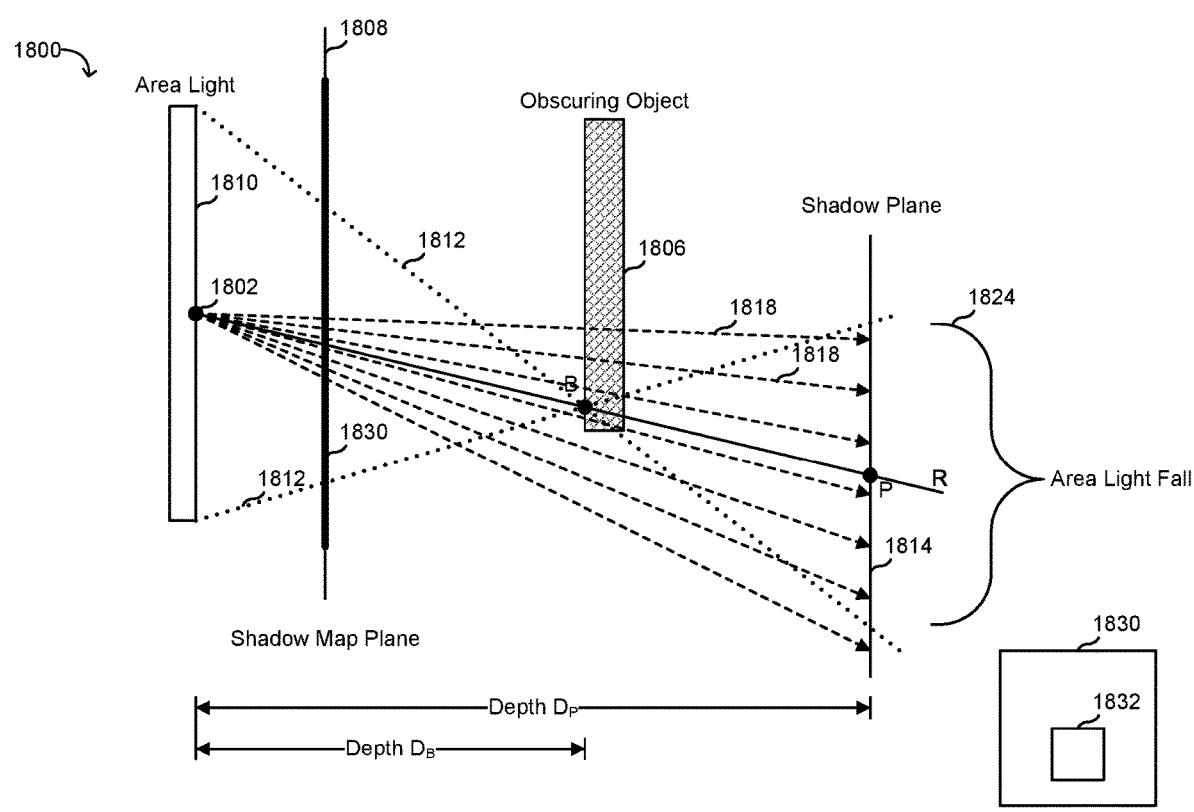
FIG. 18 illustrates how a light factor might be computed for points in a virtual scene, according to various embodiments.

FIG. 18 graphically illustrates one method a lighting or rendering module might use for quickly computing a light factor representing an approximation of amount of occlusion of an area light as seen from a point in a virtual scene. As illustrated in a diagram 1800 in FIG. 18 representing a cross-section of a virtual scene, possibly defined in a three-dimensional space, light from a point light source 1802 could illuminate various virtual objects in the scene, subject to being obscured by obscuring objects. A point P would be in a shadow cast by an obscuring object 1806 that is closer to point light source 1802 than point P is to point light source 1802. Thus, light does not travel along the solid line from point light source 1802 to point P, as it is blocked at point B of obscuring object 1806. As explained herein, a shadow map might be a data structure that encodes for objects of the scene that obscure light from point light source 1802.

A shadow map might be computed based on a two-dimensional shadow pixel array on a shadow map plane 1808, shown from a side view in FIG. 18. An example of a shadow map 1830 could be computed and stored to represent shadows through shadow map plane 1808. A value of a pixel of shadow map 1830 might be an indication of which object or objects obscure point light source 1802 and at what distance the obscuring occurs, thereby encoding for shadows cast by the obscuring objects.

For example, FIG. 18 illustrates rays from point light source 1802, some of which pass through shadow map plane 1808. Some of the rays, rays 1818, for example, first encounter obscuring object 1806 and so for their corresponding pixels in shadow map 1830, the pixel value would indicate obscuring object 1806 and a depth value of $D_B$, representing a distance from point light source 1802 to a near face of obscuring object 1806, specifically point B. A face-on view of shadow map 1830 is shown in the lower right of FIG. 18.

Where module of a renderer or lighting module is computing imagery in a virtual scene that is virtually illuminated by an area light, such as an area light 1810 shown in FIG. 18, a module might compute a light factor representing a ratio of the light from area light 1810 falling on point P by ray tracing from point P to each point of a grid of area light 1810, but that can be computationally expensive. This can be approximated by considering a shadow plane 1814 having point P thereon with a distance from point light source 1802 to point P being depth $D_P$. In some variations, a sphere comprising points of a given distance from point light source 1802 is used, but computation can often be simplified by using a shadow plane instead of a shadow sphere. From the geometric extent of area light 1810, distance $D_B$, and distance $D_P$, the module can quickly compute a mapping of area light 1810 onto shadow plane 1814, as illustrated by area light bounds 1812 (shown as dashed lines). Area light bounds 1812 can serve to define an area light fall 1824. Area light fall 1824 represents a reflection of an area of area light 1810 through point B onto shadow plane 1814. Assuming that area light 1810 emits light evenly over its area, each ray of that light would pass through point B and land on a corresponding spot on area light fall 1824. In other variations, shadow plane 1814 is not necessarily parallel with shadow map plane 1808. For example, for purposes of computing area light fall 1824, shadow plane 1814 could be such that a ray from point light source 1802 to point P is normal to shadow plane 1814.

Knowing the extent of area light fall 1824, the module can compute a corresponding region 1832 of shadow map 1830 where corresponding region 1832 is a view of area light fall 1824 from point light source 1802 through shadow map 1830. Since point B is a function of a position of point P relative to point light source 1802—it is on the solid line representing the ray from point light source 1802 to point P—and area light fall 1824 is a function of the area of area light 1810 and point B, then corresponding region 1832 of shadow map 1830 is, in a sense, a function of the position of point B and point P, among other values. A quick computation would be straightforward using geometric principles, after reading this disclosure. The module can determine, by examining pixel values in corresponding region 1832 of shadow map 1830, whether a ray through a pixel would reach shadow plane 1814 and which areas of corresponding region 1832 are in shade, at least partially, due to obscuring object B 1806 blocking light from area light 1810. This is because the depth of obscuring objects at each pixel are known or could be computed and a depth of shadow plan 1814 is known.

In the illustration of FIG. 18, the three rays of rays 1818 depicted by dashed lines passing above point B would be rays passing through corresponding region 1832—as those rays fall within area light fall 1824—but do not illuminate shadow plane 1814—as they are obscured by obscuring object 1806. The three rays that pass below obscuring object 1806 to reach shadow plane 1814 do not necessarily represent light that could reach point P, as point P is entirely obscured (assuming obscuring object 1806 is entirely opaque) from point light source 1802.

In view of the above description, it should be clear that corresponding region 1832 could be quickly computed from scene geometry, and a ratio of obscured pixels in corresponding region 1832 of shadow map 1830 to non-obscured pixels in corresponding region 1832 of shadow map 1830 could also be quickly computed to be the light factor. While the light factor might not be always exactly the same as a ratio of the area of area light 1810 that is visible from point P, the light factor computed in this way is often a good proxy, is close enough, and is often much more quickly computed, to represent a value for a ratio of light from an area light that reaches a point in a penumbra of shadows.

In some variations, partially transparent objects are present. In such cases, the light factor could be instead an average of light transmission over corresponding region 1832. In the example of FIG. 18, corresponding region 1832 is shown as being a square, but it could be another shape depending on a shape of area light 1810. For quick computation, the shadow map might be stored in a form that allows for summed-area table techniques to be used to even more quickly compute the light factor, depending on the shape of corresponding region 1832.

Figure 19:
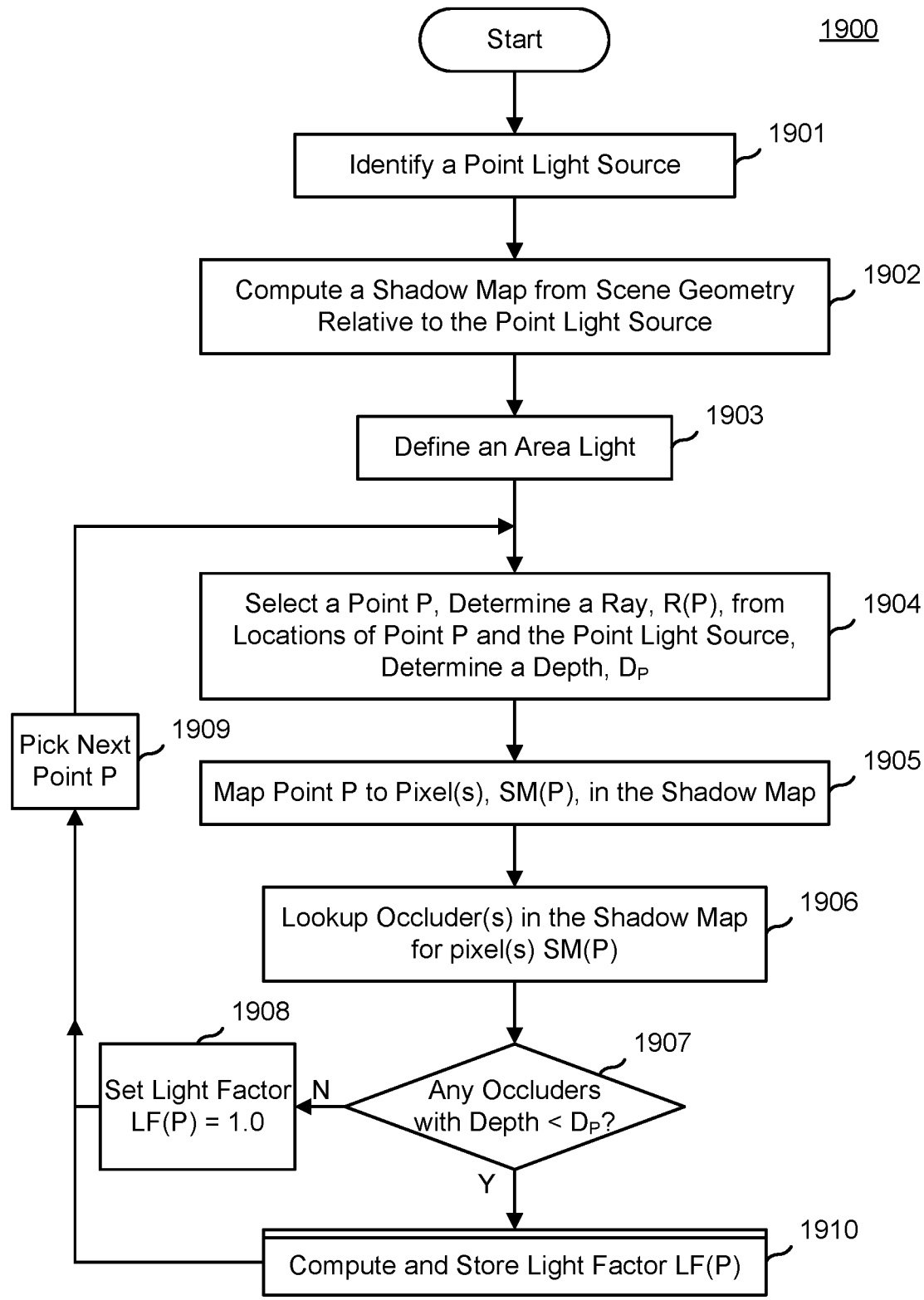
FIG. 19 is a flowchart of a method of computing light factors for points in a virtual scene, according to various embodiments.

FIG. 19 is a flowchart of a method of computing light factors for points in a virtual scene, as might be performed by a lighting module or other module of a renderer or other animation system. In a first step 1901, the module identifies a point light source (location, etc.). The module then (step 1902) computes a shadow map from scene geometry relative to the identified point light source. In step 1903, the module defines an area light, which might be defined by a rectangle, square, or other shape positioned in the scene. Next, at step 1904, the module selects a point, P, for which a light factor LF(P) is to be computed to represent at least an approximation of a ratio of light from the area light that falls on point P. In part, this might be done by first determining a ray, R(P), from the point light source location to location of point P and determining a depth, $D_P$, representing a distance from the point light source to point P. Based on those determined values, and possibly according to the description above with respect to FIG. 18, at step 1905, the module maps point P to one or more pixels, SM(P), in the computed shadow map. From there, at step 1906, the module looks up in the shadow map to identify which, if any, occluders are present for the pixels of SM(P). At step 1907, the module checks whether any of the occluders have depths less than $D_P$. The occluders with depths greater than $D_P$ can be ignored, as they do not cast any shadow on the point P at depth $D_P$. If there are no such occluders, the module sets a light factor LF(P)=1.0 at step 1908 and, at step 1909, selects the next point P and loops back to step 1904. If there are occluders, the module performs, at step 1910, a process such as that shown in FIG. 20 to compute and store the light factor LF(P) for point P and continues at step 1909.

Figure 20:
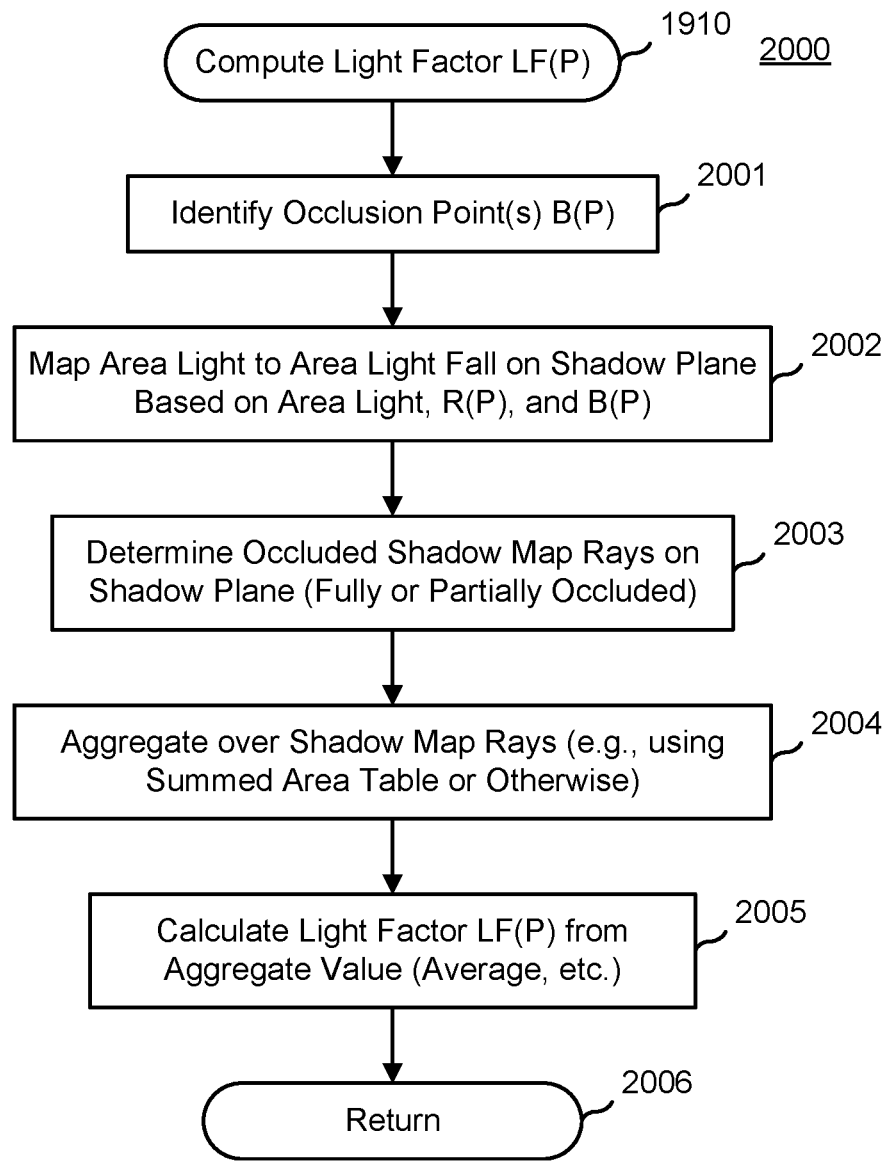
FIG. 20 is a flowchart of a method of computing a light factor for a given point in a virtual scene, according to various embodiments.

FIG. 20 is a flowchart of a method of computing a light factor for a given point, P, in a virtual scene, as might be performed by a lighting module or other module of a renderer or other animation system, and as may be used in step 1910 shown in FIG. 19. At step 2001, the module identifies one or more occlusion points B(P) that are points on objects that occlude point P from the point light source. At step 2002, the module maps the bounds of the area light to an area light fall on a shadow plane based on R(P) and B(P). At step 2003, the module determines which of the shadow map rays that fall on the shadow plane are fully or partially occluded. In some embodiments, shadow map rays outside of the area light fall might be considered. At step 2004, the module aggregates over those shadow map rays and might use summed area tables for quick computation of aggregate values or use other techniques.

Next, at step 2005, the module calculates a light factor LF(P) for point P from the aggregate value. For example, the light factor might be an average of occlusion over the shadow map rays or a count of the occluded shadow map rays divided by the total number of shadow map rays. Then, at step 2006, the module can store the light factor and returns.

Figure 21:
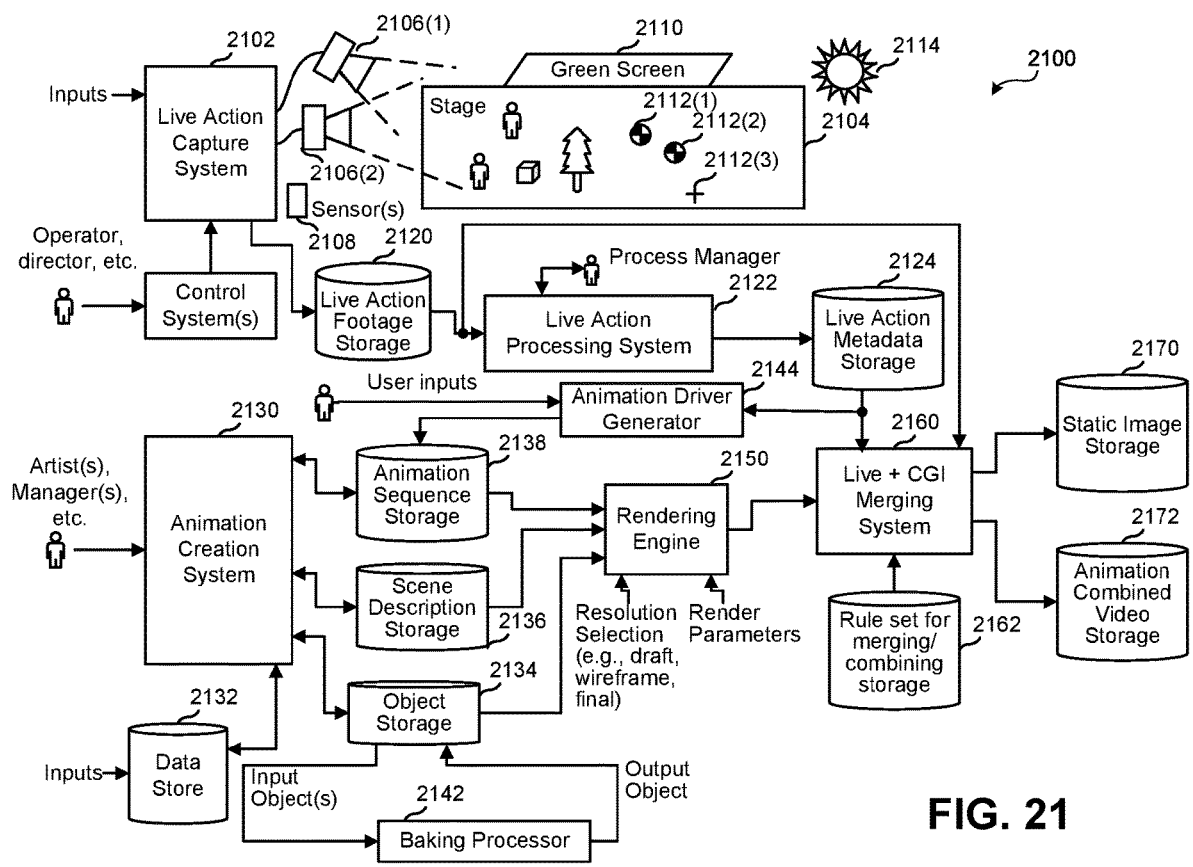
FIG. 21 illustrates an example visual content generation system as might be used to generate imagery in the form of still images and/or video sequences of images, according to various embodiments.

FIG. 21 illustrates the example visual content generation system 2100 as might be used to generate imagery in the form of still images and/or video sequences of images. Visual content generation system 2100 might generate imagery of live action scenes, computer generated scenes, or a combination thereof. In a practical system, users are provided with tools that allow them to specify, at high levels and low levels where necessary, what is to go into that imagery. For example, a user might use visual content generation system 2100 to capture interaction between two human actors performing live on a sound stage and replace one of the human actors with a computer-generated anthropomorphic non-human being that behaves in ways that mimic the replaced human actor's movements and mannerisms, and then add in a third computer-generated character and background scene elements that are computer-generated, all in order to tell a desired story or generate desired imagery.

Still images that are output by visual content generation system 2100 might be represented in computer memory as pixel arrays, such as a two-dimensional array of pixel color values, each associated with a pixel having a position in a two-dimensional image array. Pixel color values might be represented by three or more (or fewer) color values per pixel, such as a red value, a green value, and a blue value (e.g., in RGB format). Dimensions of such a two-dimensional array of pixel color values might correspond to a preferred and/or standard display scheme, such as 1920-pixel columns by 1280-pixel rows or 4096-pixel columns by 2160-pixel rows, or some other resolution Images might or might not be stored in a certain structured format, but either way, a desired image may be represented as a two-dimensional array of pixel color values. In another variation, images are represented by a pair of stereo images for three-dimensional presentations and in other variations, an image output, or a portion thereof, might represent three-dimensional imagery instead of just two-dimensional views. In yet other embodiments, pixel values are data structures and a pixel value can be associated with a pixel and can be a scalar value, a vector, or another data structure associated with a corresponding pixel. That pixel value might include color values, or not, and might include depth values, alpha values, weight values, object identifiers or other pixel value components.

A stored video sequence might include a plurality of images such as the still images described above, but where each image of the plurality of images has a place in a timing sequence and the stored video sequence is arranged so that when each image is displayed in order, at a time indicated by the timing sequence, the display presents what appears to be moving and/or changing imagery. In one representation, each image of the plurality of images is a video frame having a specified frame number that corresponds to an amount of time that would elapse from when a video sequence begins playing until that specified frame is displayed. A frame rate might be used to describe how many frames of the stored video sequence are displayed per unit time. Example video sequences might include 24 frames per second (24 FPS), 50 FPS, 140 FPS, or other frame rates. In some embodiments, frames are interlaced or otherwise presented for display, but for clarity of description, in some examples, it is assumed that a video frame has one specified display time, but other variations might be contemplated.

One method of creating a video sequence is to simply use a video camera to record a live action scene, i.e., events that physically occur and can be recorded by a video camera. The events being recorded can be events to be interpreted as viewed (such as seeing two human actors talk to each other) and/or can include events to be interpreted differently due to clever camera operations (such as moving actors about a stage to make one appear larger than the other despite the actors actually being of similar build, or using miniature objects with other miniature objects so as to be interpreted as a scene containing life-sized objects).

Creating video sequences for story-telling or other purposes often calls for scenes that cannot be created with live actors, such as a talking tree, an anthropomorphic object, space battles, and the like. Such video sequences might be generated computationally rather than capturing light from live scenes. In some instances, an entirety of a video sequence might be generated computationally, as in the case of a computer-animated feature film. In some video sequences, it is desirable to have some computer-generated imagery and some live action, perhaps with some careful merging of the two.

While computer-generated imagery might be creatable by manually specifying each color value for each pixel in each frame, this is likely too tedious to be practical. As a result, a creator uses various tools to specify the imagery at a higher level. As an example, an artist might specify the positions in a scene space, such as a three-dimensional coordinate system, of objects and/or lighting, as well as a camera viewpoint, and a camera view plane. From that, a rendering engine could take all of those as inputs, and compute each of the pixel color values in each of the frames. In another example, an artist specifies position and movement of an articulated object having some specified texture rather than specifying the color of each pixel representing that articulated object in each frame.

In a specific example, a rendering engine performs ray tracing wherein a pixel color value is determined by computing which objects lie along a ray traced in the scene space from the camera viewpoint through a point or portion of the camera view plane that corresponds to that pixel. For example, a camera view plane might be represented as a rectangle having a position in the scene space that is divided into a grid corresponding to the pixels of the ultimate image to be generated, and if a ray defined by the camera viewpoint in the scene space and a given pixel in that grid first intersects a solid, opaque, blue object, that given pixel is assigned the color blue. Of course, for modern computer-generated imagery, determining pixel colors—and thereby generating imagery—can be more complicated, as there are lighting issues, reflections, interpolations, and other considerations.

As illustrated in FIG. 21, a live action capture system 2102 captures a live scene that plays out on a stage 2104. Live action capture system 2102 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, cameras 2106(1) and 2106(2) capture the scene, while in some systems, there might be other sensor(s) 2108 that capture information from the live scene (e.g., infrared cameras, infrared sensors, motion capture ("mo-cap") detectors, etc.). On stage 2104, there might be human actors, animal actors, inanimate objects, background objects, and possibly an object such as a green screen 2110 that is designed to be captured in a live scene recording in such a way that it is easily overlaid with computer-generated imagery. Stage 2104 might also contain objects that serve as fiducials, such as fiducials 2112(1)-(3), that might be used post-capture to determine where an object was during capture. A live action scene might be illuminated by one or more lights, such as an overhead light 2114.

During or following the capture of a live action scene, live action capture system 2102 might output live action footage to a live action footage storage 2120. A live action processing system 2122 might process live action footage to generate data about that live action footage and store that data into a live action metadata storage 2124. Live action processing system 2122 might include computer processing capabilities, image processing capabilities, one or more processors, program code storage for storing program instructions executable by the one or more processors, as well as user input devices and user output devices, not all of which are shown. Live action processing system 2122 might process live action footage to determine boundaries of objects in a frame or multiple frames, determine locations of objects in a live action scene, where a camera was relative to some action, distances between moving objects and fiducials, etc. Where elements have sensors attached to them or are detected, the metadata might include location, color, and intensity of overhead light 2114, as that might be useful in post-processing to match computer-generated lighting on objects that are computer-generated and overlaid on the live action footage. Live action processing system 2122 might operate autonomously, perhaps based on predetermined program instructions, to generate and output the live action metadata upon receiving and inputting the live action footage. The live action footage can be camera-captured data as well as data from other sensors.

An animation creation system 2130 is another part of visual content generation system 2100. Animation creation system 2130 might include computer processing capabilities, image processing capabilities, one or more processors, program code storage for storing program instructions executable by the one or more processors, as well as user input devices and user output devices, not all of which are shown. Animation creation system 2130 might be used by animation artists, managers, and others to specify details, perhaps programmatically and/or interactively, of imagery to be generated. From user input and data from a database or other data source, indicated as a data store 2132, animation creation system 2130 might generate and output data representing objects (e.g., a horse, a human, a ball, a teapot, a cloud, a light source, a texture, etc.) to an object storage 2134, generate and output data representing a scene into a scene description storage 2136, and/or generate and output data representing animation sequences to an animation sequence storage 2138.

Scene data might indicate locations of objects and other visual elements, values of their parameters, lighting, camera location, camera view plane, and other details that a rendering engine 2150 might use to render CGI imagery. For example, scene data might include the locations of several articulated characters, background objects, lighting, etc. specified in a two-dimensional space, three-dimensional space, or other dimensional space (such as a 2.5-dimensional space, three-quarter dimensions, pseudo-3D spaces, etc.) along with locations of a camera viewpoint and view place from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit, but can be determined from a viewing frustum. In the case of imagery that is to be rendered to a rectangular view, the frustum would be a truncated pyramid. Other shapes for a rendered view are possible and the camera view plane could be different for different shapes.

Animation creation system 2130 might be interactive, allowing a user to read in animation sequences, scene descriptions, object details, etc. and edit those, possibly returning them to storage to update or replace existing data. As an example, an operator might read in objects from object storage into a baking processor 2142 that would transform those objects into simpler forms and return those to object storage 2134 as new or different objects. For example, an operator might read in an object that has dozens of specified parameters (movable joints, color options, textures, etc.), select some values for those parameters and then save a baked object that is a simplified object with now fixed values for those parameters.

Rather than requiring user specification of each detail of a scene, data from data store 2132 might be used to drive object presentation. For example, if an artist is creating an animation of a spaceship passing over the surface of the Earth, instead of manually drawing or specifying a coastline, the artist might specify that animation creation system 2130 is to read data from data store 2132 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements. An artist can specify an animation sequence at a high level, such as "the left hand moves from location (X1, Y1, Z1) to (X2, Y2, Z2) over time T1 to T2", at a lower level (e.g., "move the elbow joint 2.5 degrees per frame") or even at a very high level (e.g., "character A should move, consistent with the laws of physics that are given for this scene, from point P1 to point P2 along a specified path").

Animation sequences in an animated scene might be specified by what happens in a live action scene. An animation driver generator 2144 might read in live action metadata, such as data representing movements and positions of body parts of a live actor during a live action scene. Animation driver generator 2144 might generate corresponding animation parameters to be stored in animation sequence storage 2138 for use in animating a CGI object. This can be useful where a live action scene of a human actor is captured while wearing mo-cap fiducials (e.g., high-contrast markers outside actor clothing, high-visibility paint on actor skin, face, etc.) and the movement of those fiducials is determined by live action processing system 2122. Animation driver generator 2144 might convert that movement data into specifications of how joints of an articulated CGI character are to move over time.

A rendering engine 2150 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test some interaction or direction, while clarity might be more important than speed for a movie maker to generate data that will be used for final prints of feature films to be distributed. Rendering engine 2150 might include computer processing capabilities, image processing capabilities, one or more processors, program code storage for storing program instructions executable by the one or more processors, as well as user input devices and user output devices, not all of which are shown.

Visual content generation system 2100 can also include a merging system 2160 that merges live footage with animated content. The live footage might be obtained and input by reading from live action footage storage 2120 to obtain live action footage, by reading from live action metadata storage 2124 to obtain details such as presumed segmentation in captured images segmenting objects in a live action scene from their background (perhaps aided by the fact that green screen 2110 was part of the live action scene), and by obtaining CGI imagery from rendering engine 2150.

A merging system 2160 might also read data from rulesets for merging/combining storage 2162. A very simple example of a rule in a ruleset might be "obtain a full image including a two-dimensional pixel array from live footage, obtain a full image including a two-dimensional pixel array from rendering engine 2150, and output an image where each pixel is a corresponding pixel from rendering engine 2150 when the corresponding pixel in the live footage is a specific color of green, otherwise output a pixel value from the corresponding pixel in the live footage."

Merging system 2160 might include computer processing capabilities, image processing capabilities, one or more processors, program code storage for storing program instructions executable by the one or more processors, as well as user input devices and user output devices, not all of which are shown. Merging system 2160 might operate autonomously, following programming instructions, or might have a user interface or programmatic interface over which an operator can control a merging process. In some embodiments, an operator can specify parameter values to use in a merging process and/or might specify specific tweaks to be made to an output of merging system 2160, such as modifying boundaries of segmented objects, inserting blurs to smooth out imperfections, or adding other effects. Based on its inputs, merging system 2160 can output an image to be stored in a static image storage 2170 and/or a sequence of images in the form of video to be stored in an animated/combined video storage 2172.

Thus, as described, visual content generation system 2100 can be used to generate video that combines live action with computer-generated animation using various components and tools, some of which are described in more detail herein. While visual content generation system 2100 might be useful for such combinations, with suitable settings, it can be used for outputting entirely live action footage or entirely CGI sequences. The code may also be provided and/or carried by a transitory computer readable medium, e.g., a transmission medium such as in the form of a signal transmitted over a network.

According to one embodiment, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

One embodiment might include a carrier medium carrying image data that includes image data having shadow details generated using the methods described herein. The carrier medium can comprise any medium suitable for carrying the image data, including a storage medium, e.g., solid-state memory, an optical disk or a magnetic disk, or a transient medium, e.g., a signal carrying the image data such as a signal transmitted over a network, a digital signal, a radio frequency signal, an acoustic signal, an optical signal or an electrical signal.

Figure 22:
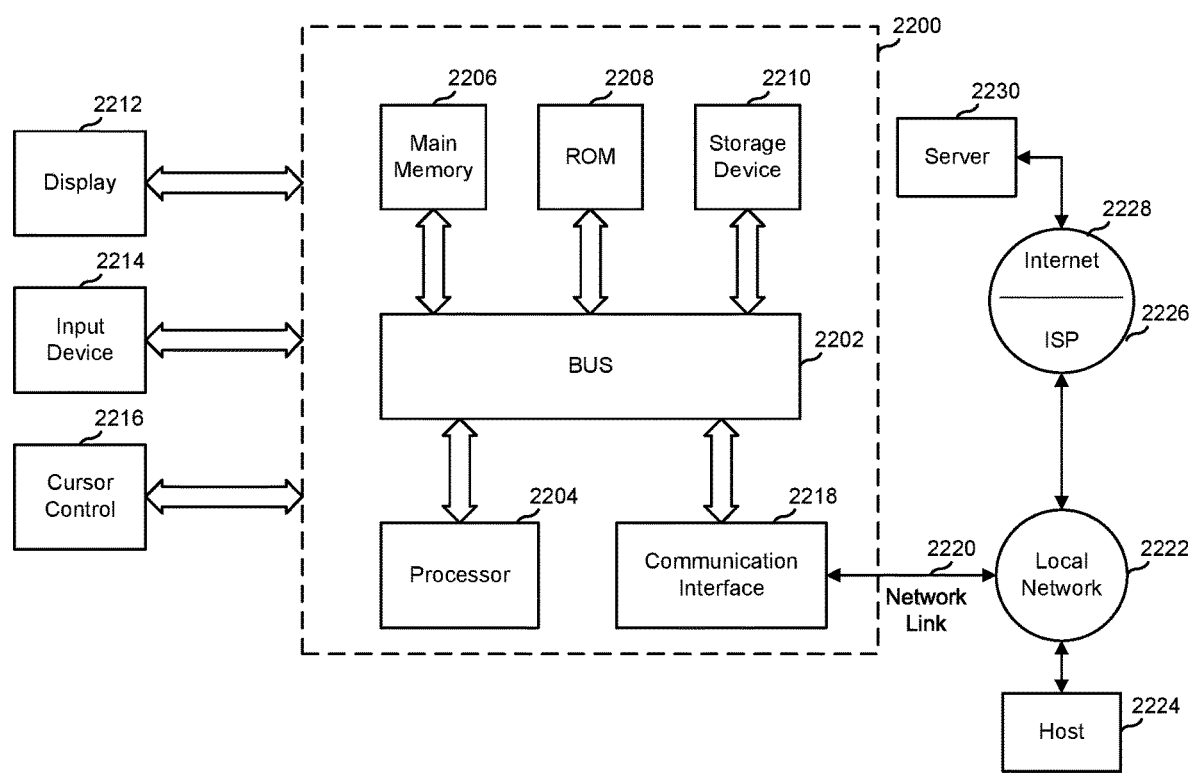
FIG. 22 is a block diagram illustrating an example computer system upon which computer systems of the systems illustrated in FIGS. 14, 21, and others may be implemented.

For example, FIG. 22 is a block diagram that illustrates a computer system 2200 upon which the computer systems of the systems described herein and/or visual content generation system 2100 (see FIG. 21) may be implemented. Computer system 2200 includes a bus 2202 or other communication mechanism for communicating information, and a processor 2204 coupled with bus 2202 for processing information. Processor 2204 may be, for example, a general-purpose microprocessor.

Computer system 2200 also includes a main memory 2206, such as a random-access memory (RAM) or other dynamic storage device, coupled to bus 2202 for storing information and instructions to be executed by processor 2204. Main memory 2206 may also be used for storing temporary variables or other intermediate information during execution of instructions to be executed by processor 2204. Such instructions, when stored in non-transitory storage media accessible to processor 2204, render computer system 2200 into a special-purpose machine that is customized to perform the operations specified in the instructions.

Computer system 2200 further includes a read only memory (ROM) 2208 or other static storage device coupled to bus 2202 for storing static information and instructions for processor 2204. A storage device 2210, such as a magnetic disk or optical disk, is provided and coupled to bus 2202 for storing information and instructions.

Computer system 2200 may be coupled via bus 2202 to a display 2212, such as a computer monitor, for displaying information to a computer user. An input device 2214, including alphanumeric and other keys, is coupled to bus 2202 for communicating information and command selections to processor 2204. Another type of user input device is a cursor control 2216, such as a mouse, a trackball, or cursor direction keys for communicating direction information and command selections to processor 2204 and for controlling cursor movement on display 2212. This input device typically has two degrees of freedom in two axes, a first axis (e.g., x) and a second axis (e.g., y), that allows the device to specify positions in a plane.

Computer system 2200 may implement the techniques described herein using customized hard-wired logic, one or more ASICs or FPGAs, firmware and/or program logic which in combination with the computer system causes or programs computer system 2200 to be a special-purpose machine. According to one embodiment, the techniques herein are performed by computer system 2200 in response to processor 2204 executing one or more sequences of one or more instructions contained in main memory 2206. Such instructions may be read into main memory 2206 from another storage medium, such as storage device 2210. Execution of the sequences of instructions contained in main memory 2206 causes processor 2204 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as storage device 2210. Volatile media includes dynamic memory, such as main memory 2206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include bus 2202. Transmission media can also take the form of acoustic or light waves, such as those generated during radio-wave and infra-red data communications.

Various forms of media may be involved in carrying one or more sequences of one or more instructions to processor 2204 for execution. For example, the instructions may initially be carried on a magnetic disk or solid-state drive of a remote computer. The remote computer can load the instructions into its dynamic memory and send the instructions over a network connection. A modem or network interface local to computer system 2200 can receive the data.

Bus 2202 carries the data to main memory 2206, from which processor 2204 retrieves and executes the instructions. The instructions received by main memory 2206 may optionally be stored on storage device 2210 either before or after execution by processor 2204.

Computer system 2200 also includes a communication interface 2218 coupled to bus 2202. Communication interface 2218 provides a two-way data communication coupling to a network link 2220 that is connected to a local network 2222. For example, communication interface 2218 may be a network card, a modem, a cable modem, or a satellite modem to provide a data communication connection to a corresponding type of telephone line or communications line. Wireless links may also be implemented. In any such implementation, communication interface 2218 sends and receives electrical, electromagnetic, or optical signals that carry digital data streams representing various types of information.

Network link 2220 typically provides data communication through one or more networks to other data devices. For example, network link 2220 may provide a connection through local network 2222 to a host computer 2224 or to data equipment operated by an Internet Service Provider (ISP) 2226. ISP 2226 in turn provides data communication services through the world-wide packet data communication network now commonly referred to as the "Internet" 2228. Local network 2222 and Internet 2228 both use electrical, electromagnetic, or optical signals that carry digital data streams. The signals through the various networks and the signals on network link 2220 and through communication interface 2218, which carry the digital data to and from computer system 2200, are example forms of transmission media.

Computer system 2200 can send messages and receive data, including program code, through the network(s), network link 2220, and communication interface 2218. In the Internet example, a server 2230 might transmit a requested code for an application program through the Internet 2228, ISP 2226, local network 2222, and communication interface 2218. The received code may be executed by processor 2204 as it is received, and/or stored in storage device 2210, or other non-volatile storage for later execution.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The code may also be provided carried by a transitory computer readable medium e.g., a transmission medium such as in the form of a signal transmitted over a network.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for processing image data that includes depth information and shadow effects, the method comprising:
   under control of one or more computer systems configured with executable instructions:
   obtaining a scene description describing elements of a scene to be rendered into a computer-generated image, the elements comprising at least a point light source and a plurality of objects including obscuring objects, wherein the point light source has a position in the scene and positions of the obscuring objects are such that the obscuring objects obscure light from the point light source, wherein obscuring of the light from the point light source by the obscuring objects is entirely obscuring or partially obscuring;

determining area light parameters for an area light, wherein the area light is a light other than from a point source and wherein the area light is represented by a geometry of a light area positioned in the scene;

determining, for a given point P, an occluder point B on an occluding object;

determining, for the given point P and the occluder point B, an area light fall region, wherein the area light fall region is a projection of the area light though occluder point B;

determining, for the area light fall region, a corresponding region of a shadow map, wherein the shadow map encodes for shadows cast by the obscuring objects;

determining, for the corresponding region, a ratio of occluded rays of the corresponding region to rays of the corresponding region; and computing a computed shadow effect of the area light and the obscuring objects on points of the scene.

2. The computer-implemented method of claim 1, wherein the ratio of the occluded rays of the corresponding region to the rays of the corresponding region are weighted by partial occlusion weights.

3. The computer-implemented method of claim 1, wherein the computed shadow effect is represented, at least in part, by a deep shadow data element that encodes for the area light parameters whereby the deep shadow data element includes references to objects that are within a light volume defined by the area light parameters and the given point on a shadowed object shadowed, at least in part, by one or more of the obscuring objects.

4. The computer-implemented method of claim 1, wherein the computed shadow effect is represented, at least in part, by a deep shadow data element that includes an acceleration structure.

5. The computer-implemented method of claim 4, wherein the acceleration structure comprises a summed area table.

6. The computer-implemented method of claim 1, wherein a shadow value contribution of a given object that is either an intersecting object or a penumbra object is based, at least in part, on a ratio of a first distance between the point light source and the given point and a second distance between the given object and the given point.

7. The computer-implemented method of claim 1, wherein the shadow map comprises a plurality of depth samples per pixel.

8. The computer-implemented method of claim 1, further comprising:

computing deep pixel maps for a plurality of pixels;

editing the scene by modifying samples in the deep pixel maps based on objects in the scene being modified;

modifying the shadow map to account for the objects in the scene being modified to form a modified shadow map; and recompositing the computer-generated image with the modified shadow map.

9. The computer-implemented method of claim 1, further comprising:

modifying the scene to reflect movement of the point light source relative to the plurality of objects in the scene, the movement being according to a movement vector; and modifying the shadow map by moving it according to the movement vector.

10. The computer-implemented method of claim 1, wherein the shadow map is computed independent of knowledge of what objects are to be rendered, whereby shadows can be added in a post-rendering compositing process.

11. A computer system comprising:

one or more processors; and a non-transitory storage medium storing instructions, which when executed by the one or more processors, cause the computer system to implement the method of claim 1.

12. A non-transitory computer-readable storage medium storing instructions, which when executed by at least one processor of a computer system, causes the computer system to carry out the method of claim 1.

13. A non-transitory computer-readable medium carrying instructions, which when executed by at least one processor of a computer system, causes the computer system to carry out the method of claim 1.

14. A non-transitory carrier medium carrying image data that results from independent shadow processing according to the method of claim 1.

15. A computer-implemented image generator comprising:

a first storage for a deep pixel image dataset, wherein deep pixels represented in the deep pixel image dataset include depth information;

a second storage for obtaining a scene description describing elements of a scene to be rendered into a computer-generated image, the elements comprising at least a point light source and a plurality of objects including occluding objects, wherein the point light source has a position in the scene and positions of the occluding objects are such that the occluding objects occlude light from the point light source, wherein occluding of the light from the point light source by the occluding objects is entirely occluding or partially occluding;

a third storage for at least one deep shadow data element that encodes for area light parameters of an area light, whereby the at least one deep shadow data element includes references to objects that are within a light volume defined by the area light parameters and a given point on a shadowed object, wherein the area light is a light other than from a point source and wherein the area light is represented by a geometry of a light area positioned in the scene;

a fourth storage for a shadow map including data that encodes for shadows cast by the occluding objects and shadow map depths of the occluding objects;

a fifth storage for storing executable instructions, which when executed by the computer-implemented image generator:

(a) determine, for an occluder point, B, on an occluding object and a given point P, an area light fall region, wherein the area light fall region is a projection of the area light though occluder point B;

(b) determine, for the area light fall region, a corresponding region of the shadow map; and (c) determine, for the corresponding region, a ratio of occluded rays of the corresponding region to rays of the corresponding region; and a sixth storage for a computed shadow effect of the area light and the occluding objects on points of the scene.

16. The computer-implemented image generator of claim 15, wherein the first storage and the fourth storage are each a portion of one deep pixel data structure.

17. The computer-implemented image generator of claim 15, wherein the computed shadow effect is represented, at least in part, by the at least one deep shadow data element, and wherein the third storage includes an acceleration structure that comprises a summed area table.

18. The computer-implemented image generator of claim 15, wherein a shadow value contribution of a given object that is either an intersecting object or a penumbra object is based, at least in part, on a ratio of a first distance between the point light source and the given point and a second distance between the given object and the given point.

19. The computer-implemented image generator of claim 15, wherein the shadow map comprises a plurality of depth samples per pixel.

20. The computer-implemented image generator of claim 15, wherein the fifth storage stores additional executable instructions, which when executed by the computer-implemented image generator:
   (d) compute deep pixel maps for a plurality of pixels;
   (e) edit the scene by modifying samples in the deep pixel maps based on objects in the scene being modified; and
   (f) modify the shadow map to account for the objects in the scene being modified to form a modified shadow map; and
   the computer-implemented image generator further comprising a seventh storage for storing a recomposited computer-generated image with the modified shadow map.

21. The computer-implemented image generator of claim 15, wherein the fifth storage stores additional executable instructions, which when executed by the computer-implemented image generator:
   (d) modify the scene to reflect movement of the point light source relative to the plurality of objects in the scene, the movement being according to a movement vector; and
   (e) modify the shadow map by moving it according to the movement vector.

* * * * *